(12) United States Patent
Keller et al.

(10) Patent No.: US 10,989,330 B1
(45) Date of Patent: Apr. 27, 2021

(54) FLUIDIC SWITCHING DEVICES

(71) Applicant: Facebook Technologies, LLC, Menlo Park, CA (US)

(72) Inventors: Sean Jason Keller, Bellevue, WA (US); David R. Perek, Seattle, WA (US); Tristan Thomas Trutna, Seattle, WA (US); Nicholas Roy Corson, Woodinville, WA (US); Raymond King, Woodinville, WA (US); Jack Lindsay, Seattle, WA (US); Riccardo DeSalvo, Pasadena, CA (US); Joseph Minh Tien, Alhambra, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 21 days.

(21) Appl. No.: 16/701,660

(22) Filed: Dec. 3, 2019

Related U.S. Application Data

(63) Continuation of application No. 15/824,294, filed on Nov. 28, 2017, now Pat. No. 10,514,111.

(Continued)

(51) Int. Cl.
*F15B 15/00* (2006.01)
*F16K 99/00* (2006.01)
(Continued)

(52) U.S. Cl.
CPC ........... *F16K 99/0026* (2013.01); *F15C 3/04* (2013.01); *F16K 99/0015* (2013.01);
(Continued)

(58) Field of Classification Search
CPC ........... F16K 99/0026; F16K 99/0015; F16K 99/0057; F16K 99/0061; F15C 3/04; G06F 3/016; G08B 6/00; G06T 19/006
(Continued)

(56) References Cited

U.S. PATENT DOCUMENTS 844,410 A 2/1907 Schauer et al.
2,069,261 A ‡ 2/1937 Monnet .................. B24B 57/00
137/266

(Continued)

FOREIGN PATENT DOCUMENTS

CN 110446997 A 11/2019
EP 3 351 839 A2 7/2018
(Continued)

OTHER PUBLICATIONS

Devaraju, N.S.G.K. et al., "Pressure Driven Digital Logic in PDMS Based Microfluidic Devices Fabricated by Multilayer Soft Lithography," Lab Chip, The Royal Society of Chemistry, 2012, pp. 4809-4815, vol. 12.‡

(Continued)

*Primary Examiner* — Minh Q Le
(74) *Attorney, Agent, or Firm* — FisherBroyles, LLP

(57) ABSTRACT

A fluidic device controls fluid flow in channel from a source to a drain. In some embodiments, the fluidic device comprises a channel and a gate. The channel is configured to transport a fluid from the source to the drain. The gate controls a rate of fluid flow in the channel in accordance with the fluid pressure within the gate. Specifically, the gate is configured to induce a first flow rate of the fluid in the channel in accordance with a low pressure state of the gate, and a second flow rate of the fluid in the channel in accordance with a high pressure state of the gate. In certain embodiments, the first flow rate is greater than the second flow rate. In alternative embodiments, the second flow rate is greater than the first flow rate.

20 Claims, 11 Drawing Sheets

Decoding Table
950

| a | b | c | d | e | f |
|---|---|---|---|---|---|
| 0 | 0 | 1 | 0 | 0 | 0 |
| 0 | 1 | 0 | 1 | 0 | 0 |
| 1 | 0 | 0 | 0 | 1 | 0 |
| 1 | 1 | 0 | 0 | 0 | 1 |

Related U.S. Application Data

(60) Provisional application No. 62/449,323, filed on Jan. 23, 2017.

(51) Int. Cl.
*F15C 3/04* (2006.01)
*G06F 3/01* (2006.01)
*G08B 6/00* (2006.01)
*G06T 19/00* (2011.01)

(52) U.S. Cl.
CPC ...... *F16K 99/0057* (2013.01); *F16K 99/0061* (2013.01); *G06F 3/016* (2013.01); *G08B 6/00* (2013.01); *G06T 19/006* (2013.01)

(58) Field of Classification Search
USPC .............. 137/596.14; 251/5, 61.1, 343, 344; 340/407.1, 407.2
See application file for complete search history.

(56) References Cited

U.S. PATENT DOCUMENTS

| | | | | |
|---|---|---|---|---|
| 2,241,086 A ‡ | 5/1941 | Gould | .................. | F15B 5/00 62/223 |
| 2,345,693 A ‡ | 4/1944 | Wilson | ................ | F04B 43/0072 417/38 |
| 2,590,215 A ‡ | 3/1952 | Sausa | .................. | F16K 7/07 138/45 |
| 2,715,009 A ‡ | 8/1955 | Beekley | ................ | F16K 31/126 251/61 |
| 3,237,616 A ‡ | 3/1966 | Daigh | .................. | F01M 13/023 123/574 |
| 3,308,898 A ‡ | 3/1967 | Allen | .................... | B65B 39/001 177/113 |
| 3,468,342 A ‡ | 9/1969 | Craft | .................... | F15B 13/00 137/596.18 |
| 3,549,118 A ‡ | 12/1970 | Bluder | .................. | F16K 31/165 251/58 |
| 3,695,576 A ‡ | 10/1972 | Kane | .................... | B65D 90/56 138/132 |
| 3,759,483 A ‡ | 9/1973 | Baxter | .................. | F16K 7/06 251/251 |
| 3,936,028 A ‡ | 2/1976 | Norton | .................. | F16K 7/07 251/5 |
| 3,951,168 A ‡ | 4/1976 | Roberts | .................. | F16K 7/18 137/62 |
| 4,071,039 A ‡ | 1/1978 | Goof | .................... | F16K 7/04 137/494 |
| 4,300,748 A ‡ | 11/1981 | Kreeley | .................. | F16K 7/10 137/489 |
| 4,322,054 A ‡ | 3/1982 | Campbell | ................ | F16K 7/061 251/5 |
| 4,494,345 A ‡ | 1/1985 | Peterson | .................. | E03F 7/04 137/414 |
| 5,071,411 A ‡ | 12/1991 | Hillstead | ............ | A61B 17/3462 251/341 |
| 5,078,363 A ‡ | 1/1992 | Gregory | .................. | F16K 1/24 251/14 |
| 5,186,431 A ‡ | 2/1993 | Tamari | .................. | A61M 1/3621 251/5 |
| 5,354,162 A ‡ | 10/1994 | Burdea | .................. | A61F 5/0118 414/4 |
| 5,441,231 A ‡ | 8/1995 | Payne | .................... | F16K 7/066 251/5 |
| 6,053,191 A ‡ | 4/2000 | Hussey | .................. | F16K 7/075 137/15.18 |
| 6,406,605 B1 ‡ | 6/2002 | Moles | .................... | F15C 5/00 137/83 |
| 6,461,335 B1 ‡ | 10/2002 | Noecker | .................. | A61M 5/14 251/349 |
| 6,474,623 B1 ‡ | 11/2002 | Davies | .................. | F16K 31/1655 251/22 |
| 6,505,810 B2 ‡ | 1/2003 | Abromaitis | ............... | F16K 7/04 251/4 |
| 7,703,477 B2 ‡ | 4/2010 | Cook | ...................... | F16K 7/075 137/489 |
| 7,998,121 B2 ‡ | 8/2011 | Stringham | ............ | A61M 5/142 251/4 |
| 8,034,065 B2 ‡ | 10/2011 | Coe | ...................... | A61F 5/0053 251/5 |
| 8,286,933 B2 ‡ | 10/2012 | Hanada | .................. | F16K 23/00 251/229 |
| 8,603,834 B2 ‡ | 12/2013 | Puleo | .................. | B01L 3/50273 251/12 |
| 8,922,355 B2 ‡ | 12/2014 | Kusuura | .................. | G06F 3/00 340/40 |
| 2002/0158217 A1 ‡ | 10/2002 | Inoue | ...................... | F16K 7/06 251/5 |
| 2002/0169424 A1 ‡ | 11/2002 | Miles | .................... | A61M 5/142 604/256 |
| 2003/0010946 A1 ‡ | 1/2003 | Furukawa | ............... | F16K 7/066 251/5 |
| 2003/0141470 A1 ‡ | 7/2003 | Igarashi | .................... | F16K 7/04 251/5 |
| 2003/0196695 A1 ‡ | 10/2003 | O'Connor | ............. | B01L 3/5025 137/87 |
| 2004/0033108 A1 ‡ | 2/2004 | Raftis | ........................ | E03F 7/02 405/37 |
| 2004/0056220 A1 ‡ | 3/2004 | Raftis | ........................ | F16K 7/17 251/5 |
| 2006/0058740 A1 ‡ | 3/2006 | Cise | ...................... | A61M 5/142 604/24 |
| 2006/0243934 A1 ‡ | 11/2006 | Chung | .................. | F16K 31/002 251/11 |
| 2007/0170382 A1 ‡ | 7/2007 | Li | .............................. | F16K 7/06 251/5 |
| 2008/0087853 A1 ‡ | 4/2008 | Kees | ...................... | F16K 7/065 251/5 |
| 2008/0264863 A1 ‡ | 10/2008 | Quake | .................... | B01J 20/286 210/651 |
| 2009/0007969 A1 ‡ | 1/2009 | Gundel | ............... | F16K 99/0001 137/15.18 |
| 2009/0145502 A1 ‡ | 6/2009 | Dirac | .................. | F16K 31/002 137/803 |
| 2009/0302244 A1 ‡ | 12/2009 | Wedel | .................. | A61M 39/284 251/5 |
| 2010/0078584 A1 ‡ | 4/2010 | Van Den Bijgaart | ..... | F15C 5/00 251/33 |
| 2010/0093559 A1 ‡ | 4/2010 | Fan | .................... | B01L 3/502738 506/9 |
| 2010/0170572 A1 ‡ | 7/2010 | Sahoo | .................. | B01L 3/50273 137/14 |
| 2010/0180970 A1 ‡ | 7/2010 | Welle | ...................... | F15C 1/04 137/82 |
| 2010/0260617 A1 ‡ | 10/2010 | Haertl | .................... | F04B 43/06 417/53 |
| 2010/0266980 A1 ‡ | 10/2010 | Boyd | .................... | A61C 1/0084 433/84 |
| 2011/0045599 A1 ‡ | 2/2011 | Erickson | ........... | B01L 3/502738 436/11 |
| 2012/0039770 A1 ‡ | 2/2012 | Namkoong | ....... | B01L 3/502738 422/50 |
| 2012/0275929 A1 ‡ | 11/2012 | Salsman | .................. | F04B 43/04 417/53 |
| 2013/0255815 A1 ‡ | 10/2013 | Brinkmann | ....... | F16L 55/02727 138/46 |
| 2014/0130920 A1 ‡ | 5/2014 | Fernandes | ........... | F16K 99/0009 137/83 |
| 2014/0134001 A1 ‡ | 5/2014 | Uchida | .................. | A61M 5/1422 417/53 |
| 2015/0267822 A1 ‡ | 9/2015 | Nissen | .................... | F16K 7/07 251/5 |
| 2017/0300115 A1 ‡ | 10/2017 | Kerr | ...................... | G06F 3/016 |
| 2017/0322629 A1 ‡ | 11/2017 | Pirasmepulkul | ........ | G06F 3/011 |
| 2018/0003319 A1 ‡ | 1/2018 | Besse | .................. | F16K 99/0038 |
| 2018/0038513 A1 ‡ | 2/2018 | Baldea | ............... | F16K 99/0026 |

(56) References Cited

U.S. PATENT DOCUMENTS

| 2018/0158367 A1‡ | 6/2018 | Russomanno | F15D 1/007 |
| 2018/0161671 A1‡ | 6/2018 | Heubel | G06F 3/011 |
| 2018/0209562 A1 | 7/2018 | Keller et al. | |

FOREIGN PATENT DOCUMENTS

| JP | 2005-308200 A | 11/2005 |
| KR | 10-2016-0098056 A | 8/2016 |
| WO | 89/05417 A1 | 6/1989 |
| WO | 02/053290 A2 | 7/2002 |
| WO | 2010/104878 A1 | 9/2010 |
| WO | 2012/126646 A1 | 9/2012 |
| WO | 2016/205143 A1 | 12/2016 |
| WO | 2016/205428 A1 | 12/2016 |
| WO | 2018/136160 A1 | 7/2018 |

OTHER PUBLICATIONS

Mohan, E. et al., "Design Considerations for Elastomeric Normally Closed Microfluidic Valves," Sensors and Actuators B: Chemical: International Journal Devoted to Research and Development of Physical and Chemical Transducers, Sep. 17, 2011, pp. 1216-1223, vol. 160, No. 1.‡

Frank, P. et al., "Integrated Microfluidic Membrane Transistor Utilizing Chemical Information for On-Chip Flow Control," PLOS One, Aug. 29, 2016, e016124, 17 pages, vol. 11, No. 8.‡

Yu, Q. et al., "Responsive Biomimetic Hydrogel Valve for Microfluidics," Applied Physics Letters, Apr. 23, 2001, pp. 2589-2591, vol. 78, No. 17.‡

Perdigones, F.A. et al., "Correspondence Between Electronics and Fluids in MEMS: Designing Microfluidic Systems Using Electronics," IEEE Industrial Electronics Magazine, Dec. 2014, pp. 6-17, vol. 8, No. 4.‡

European Partial Search Report, European Application No. 18158349.3, dated Sep. 20, 2018, 17 pages.‡

Eddington, D. et al., "Flow Control with Hydrogels," Advanced Drug Delivery Reviews, Feb. 10, 2004, pp. 199-210, vol. 56, No. 2.‡

European Partial Search Report, European Application No. 18151564.4, dated Jul. 17, 2018, 17 pages.‡

PCT International Search Report and Written Opinion, PCT Application No. PCT/US2017/064683, dated Mar. 30, 2018, 19 pages.‡

PCT International Search Report, PCT Application No. PCT/US2017/052048, dated May 23, 2018, 18 pages.‡

Non-Final Office Action received for U.S. Appl. No. 15/824,294 dated Mar. 7, 2019, 32 pages.

Notice of Allowance received for U.S. Appl. No. 15/824,294 dated Aug. 12, 2019, 20 pages.

International Search Report and Written Opinion received for PCT Application Serial No. PCT/US2017/064683 dated Mar. 30, 2018, 19 pages.

Devaraju et al., "Pressure Driven Digital Logic in PDMS Based Microfluidic Devices Fabricated by Multilayer Soft Lithography", Lab Chip, The Royal Society of Chemistry, vol. 12, 2012, pp. 4809-4815.

International Search Report and Written Opinion received for PCT Application Serial No. PCT/US2017/052048 dated May 23, 2018, 18 pages.

Partial European Search Report received for EP Patent Application Serial No. 18151564.4 dated Jul. 17, 2018, 15 pages.

Partial European Search Report received for EP Patent Application Serial No. 18158349.3 dated Sep. 20, 2018, 15 pages.

Eddington et al., "Flow Control with Hydrogels", Advanced Drug Delivery Reviews, vol. 56, No. 2, Feb. 10, 2004, pp. 199-210.

Frank et al., "Integrated Microfluidic Membrane Transistor Utilizing Chemical Information for On-Chip Flow Control", PLOS One, vol. 11, No. 8, Aug. 29, 2016, pp. 1-17.

Mohan et al., "Design Considerations for Elastomeric Normally Closed Microfluidic Valves", Sensors and Actuators B: Chemical, International Journal Devoted to Research and Development of Physical and Chemical Transducers, vol. 160, No. 11, Sep. 17, 2011, pp. 1216-1223.

Perdigones et al., "Correspondence Between Electronics and Fluids in MEMS: Designing Microfluidic Systems Using Electronics," IEEE Industrial Electronics Magazine, vol. 8, No. 4, Dec. 1, 2014, pp. 6-17.

Yu et al., "Responsive Biomimetic Hydrogel Valve for Microfluidics," Applied Physics Letters, vol. 78, No. 17, Apr. 23, 2001, pp. 2589-2591.

Extended European Search Report received for EP Patent Application Serial No. 18151564.4 dated Nov. 26, 2018, 15 pages.

International Search Report and Written Opinion received for PCT Application Serial No. PCT/US2018/046486 dated Jan. 8, 2019, 15 pages.

Communication pursuant to Article 94(3) EPC received for EP Patent Application Serial No. 18151564.4 dated Nov. 27, 2019, 8 pages.

‡ imported from a related application

FLUIDIC SWITCHING DEVICES

CROSS REFERENCE TO RELATED APPLICATION

This application is a continuation of U.S. application Ser. No. 15/824,294, filed Nov. 28, 2017, which claims the benefit of U.S. Provisional Patent Application Ser. No. 62/449,323, filed Jan. 23, 2017, the disclosures of each of which are incorporated, in their entirety, by this reference.

BACKGROUND

The present disclosure generally relates to fluidic devices for head-mounted displays (HMD) and/or haptic devices, and more specifically to using fluidic devices in virtual reality systems.

Virtual reality (VR) is a simulated environment created by computer technology and presented to a user, such as through a VR system. In some VR systems wearable devices (e.g., glove) allow a user to interact with virtual objects. Circuitry on such wearable devices can be complex, bulky, and in some cases heavy. As a result, conventional wearable devices can detract from a user's experience with a VR system

SUMMARY

Embodiments of the disclosed invention include fluidic devices used in VR, augmented reality (AR) systems, and/or mixed reality (MR) systems. Fluidic devices are fluid handling devices that function analogous to electronic devices (e.g., an electrical transistor, an electrical diode, a resistor, a capacitor, etc.). For example, a fluidic device may be designed such that it operates as a fluidic transistor. Additionally, fluidic devices are composable, meaning that fluidic devices may be coupled together to form a composite fluidic device (e.g., a decoder). In some embodiments, groups of fluidic devices are coupled together to act as controllers for a haptic apparatuses on wearable devices (e.g., haptic gloves) for a VR system.

A fluidic device generally includes a channel that includes an input (e.g., a source) and an output (e.g. a drain). The channel directs a fluid (e.g., liquid or gas) from the input to the output. The fluidic device also includes a gate that affects the flow of fluid in the channel. For example, in some embodiments, once a threshold gate pressure is achieved (i.e., a high pressure state), the gate may restrict the fluid flow in the channel. In alternate embodiments, the flow in the channel is restricted until a threshold pressure (i.e., the high pressure state) in the gate is achieved.

In some embodiments, a fluidic device comprises a channel and a gate. The channel is configured to transport a fluid from a source to a drain. In such embodiments, the source is an input for fluid to enter the channel and the drain is an output for fluid to exit the channel. The gate controls a rate of fluid flow between the source and the drain in accordance with the fluid pressure within the gate. Specifically, the gate is configured to induce a first flow rate of the fluid in the channel in accordance with a low pressure state of the gate, and a second flow rate of the fluid in the channel in accordance with a high pressure state of the gate. In certain embodiments, the first flow rate is greater than the second flow rate. In alternative embodiments, the second flow rate is greater than the first flow rate.

In one embodiment, a wearable device is implemented in a system for providing VR, AR, MR, or some combination thereof, experience to a user who wears the device. In more detail, the wearable device provides haptic feedback to the user in response to instructions from a console of the system. The wearable device includes at least one actuator, and a controller. The controller is composed of a plurality of fluidic devices, including at least one fluidic device described herein. In some embodiments, the fluidic devices are coupled together to form one or more composite fluidic devices. For example, a composite device may be a decoder that is used to address the at least one actuator.

Figure 1:
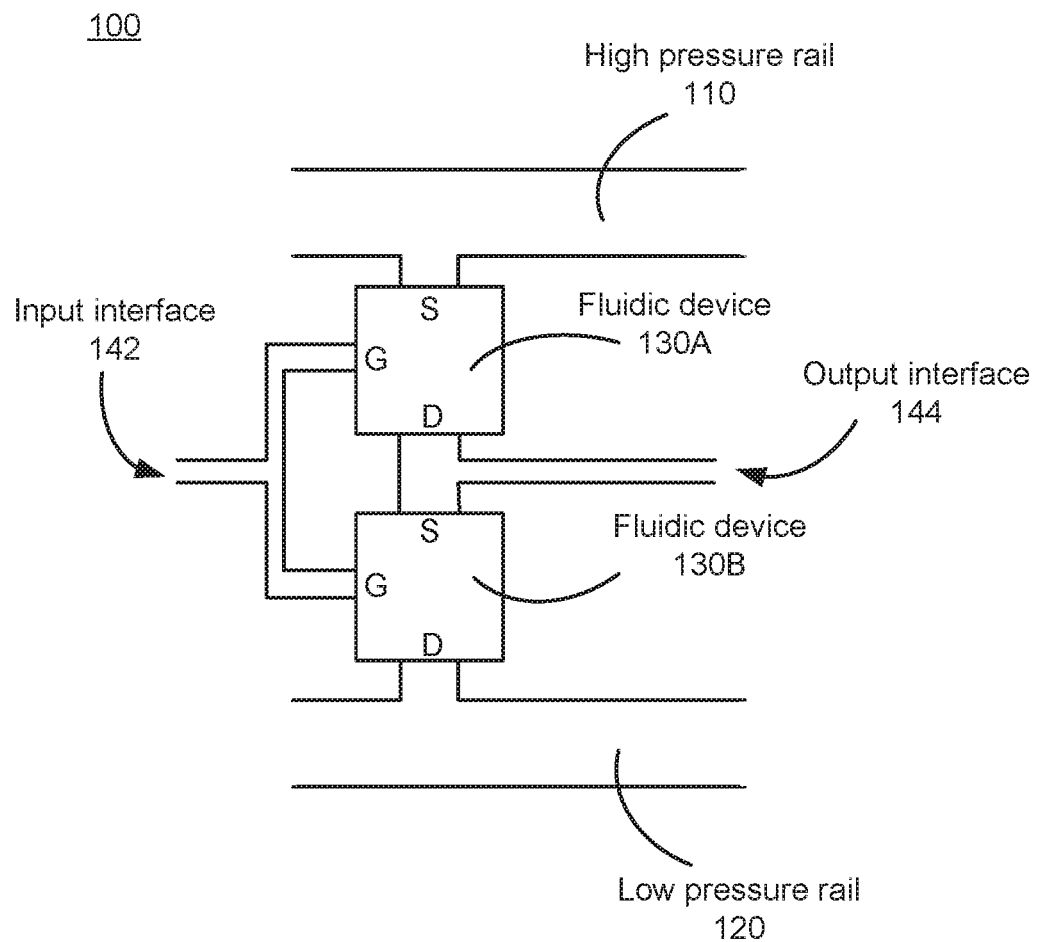
FIG. 1 is an example diagram of a composite fluidic device, in accordance with an embodiment.
Figure 2:
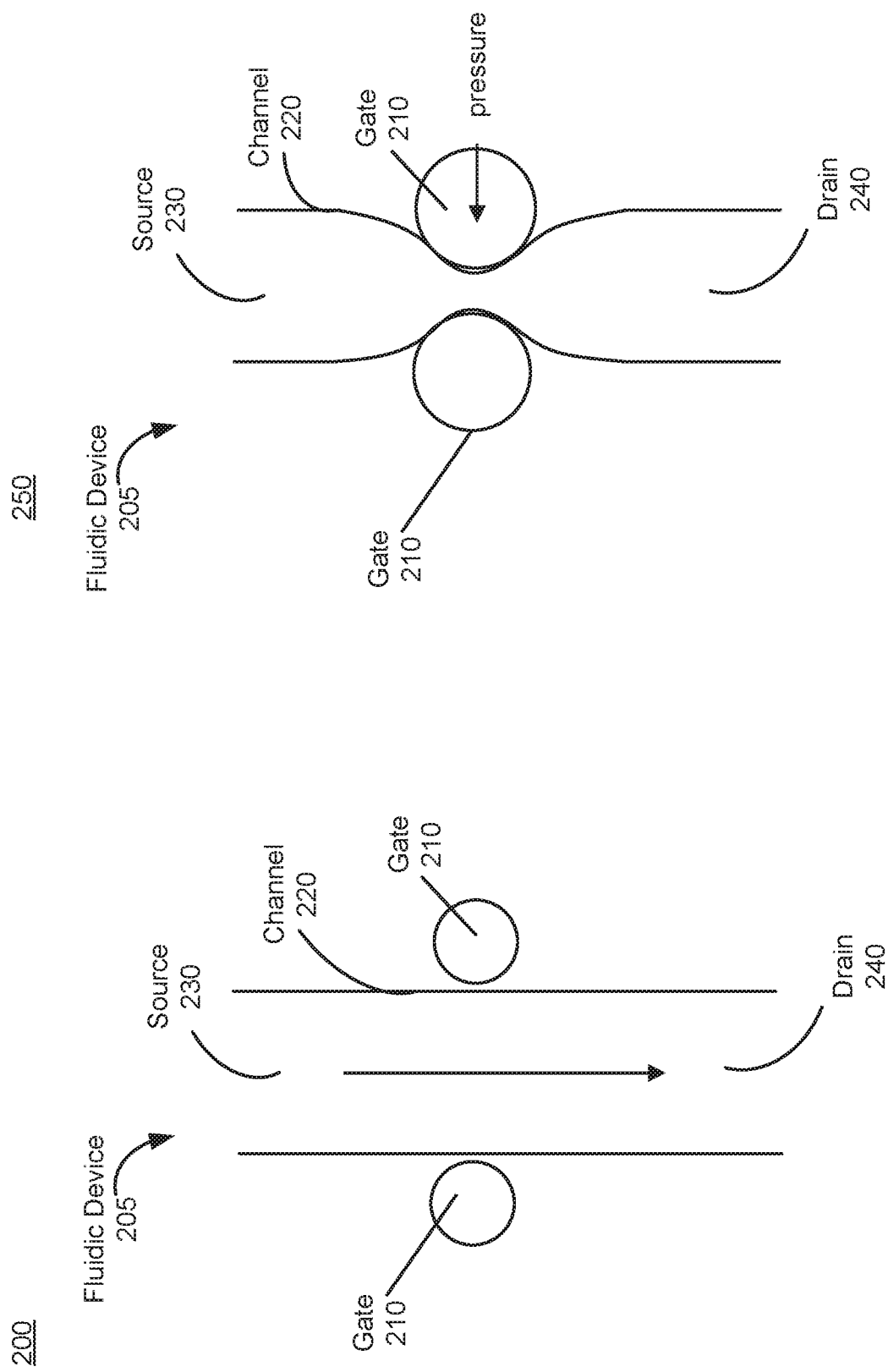
FIG. 2A is cross section of an example fluidic device including a gate designed to constrict a channel with the gate at a low pressure state, in accordance with an embodiment.
FIG. 2B is a cross section of the example fluidic device shown in FIG. 2A, with the gate at a high pressure state, in accordance with an embodiment.
Figure 3:
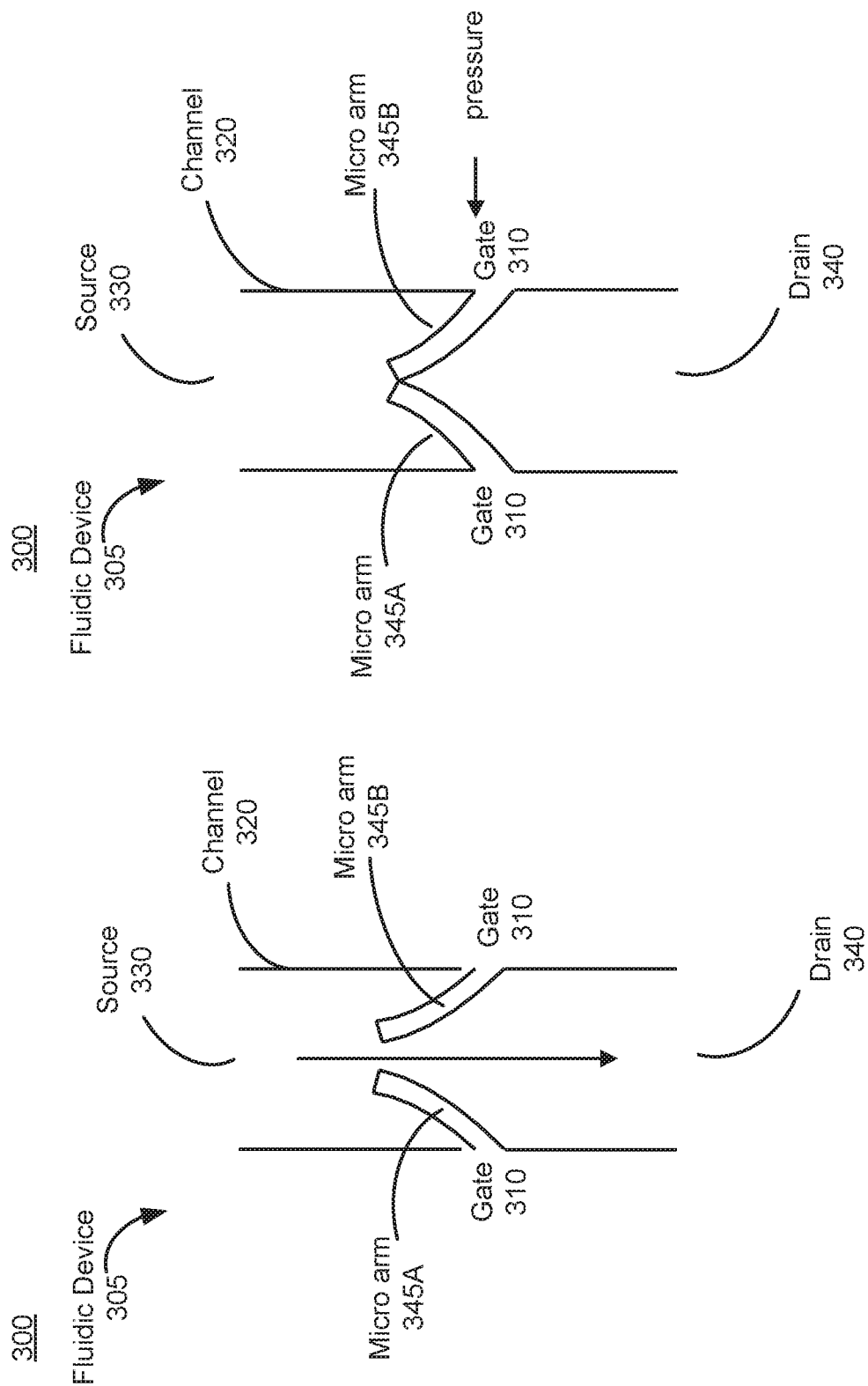
FIG. 3A is a cross section of an example fluidic device including a gate designed to regulate fluid flow through a channel, with the gate at a low pressure state, in accordance with an embodiment.
FIG. 3B is a cross section of the example fluidic device shown in FIG. 3A with the gate at a high pressure state, in accordance with an embodiment.
Figure 4:
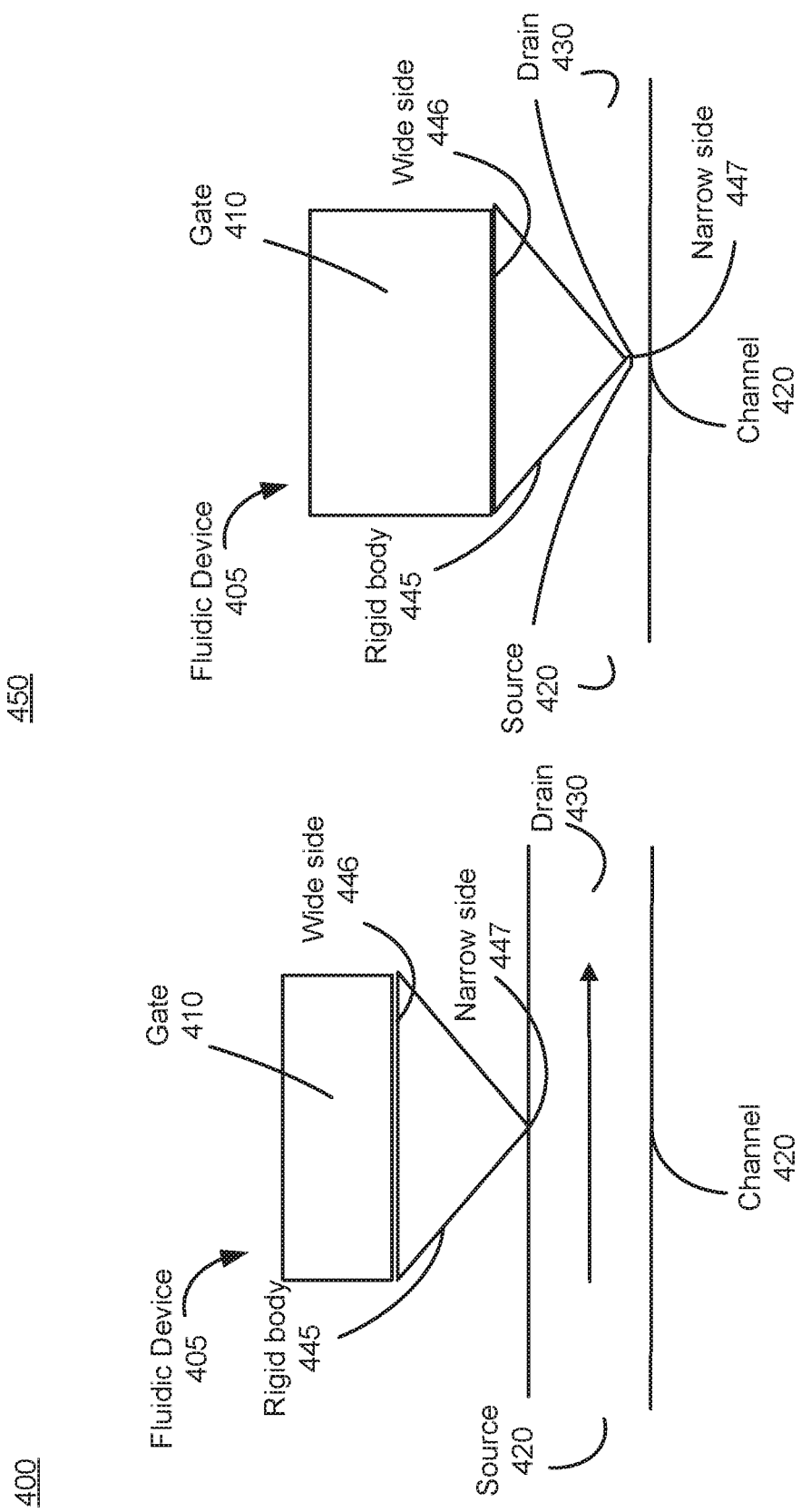
FIG. 4A is a cross section of an example fluidic device including a gate and a rigid body, with the gate at a low pressure state, in accordance with an embodiment.
FIG. 4B is a cross section of the example fluidic device shown in FIG. 4A with the gate at a high pressure state, in accordance with an embodiment
Figure 5:
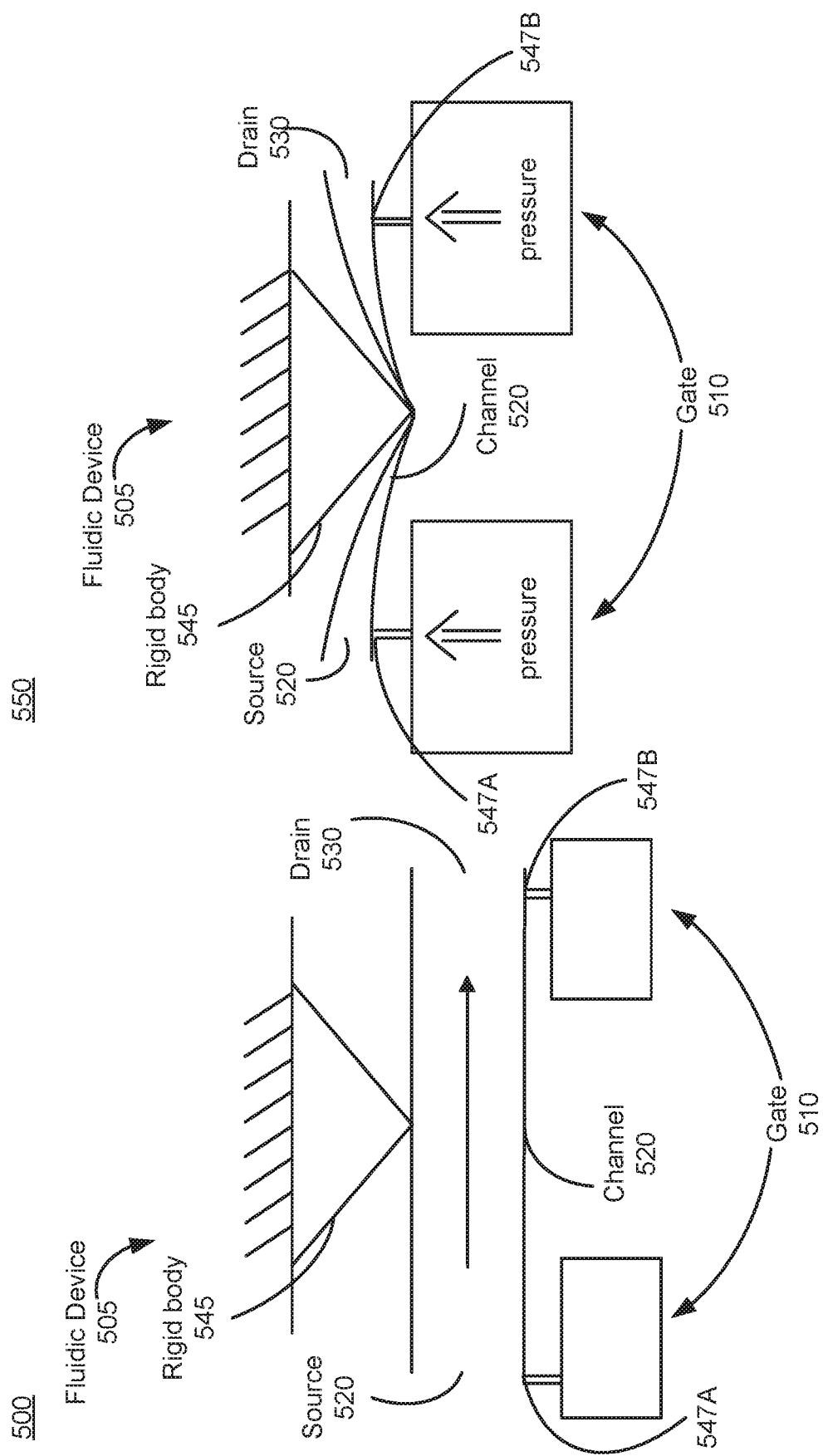
FIG. 5A is a cross section of an example fluidic device including a gate and a rigid body, with the gate at a low pressure state, in accordance with an embodiment
FIG. 5B is an example fluidic device shown in FIG. 5A with the gate at a high pressure state, in accordance with an embodiment.
Figure 6:
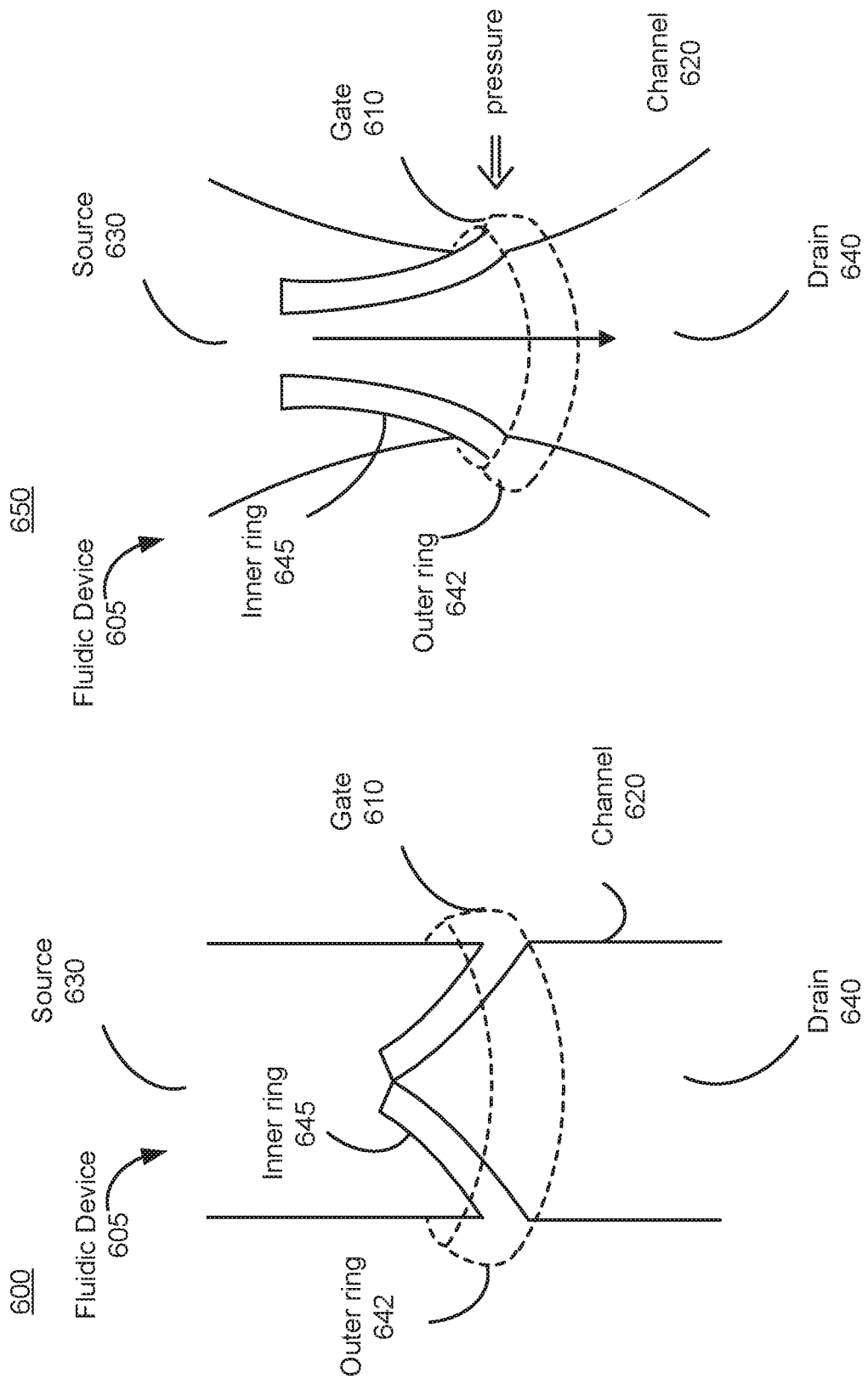
FIG. 6A is a cross section of an example fluidic device including a gate designed to constrict a channel with the gate at a low pressure state, in accordance with an embodiment
FIG. 6B is a cross section of the example fluidic device shown in FIG. 6A with the gate at a high pressure state, in accordance with an embodiment.
Figure 7:
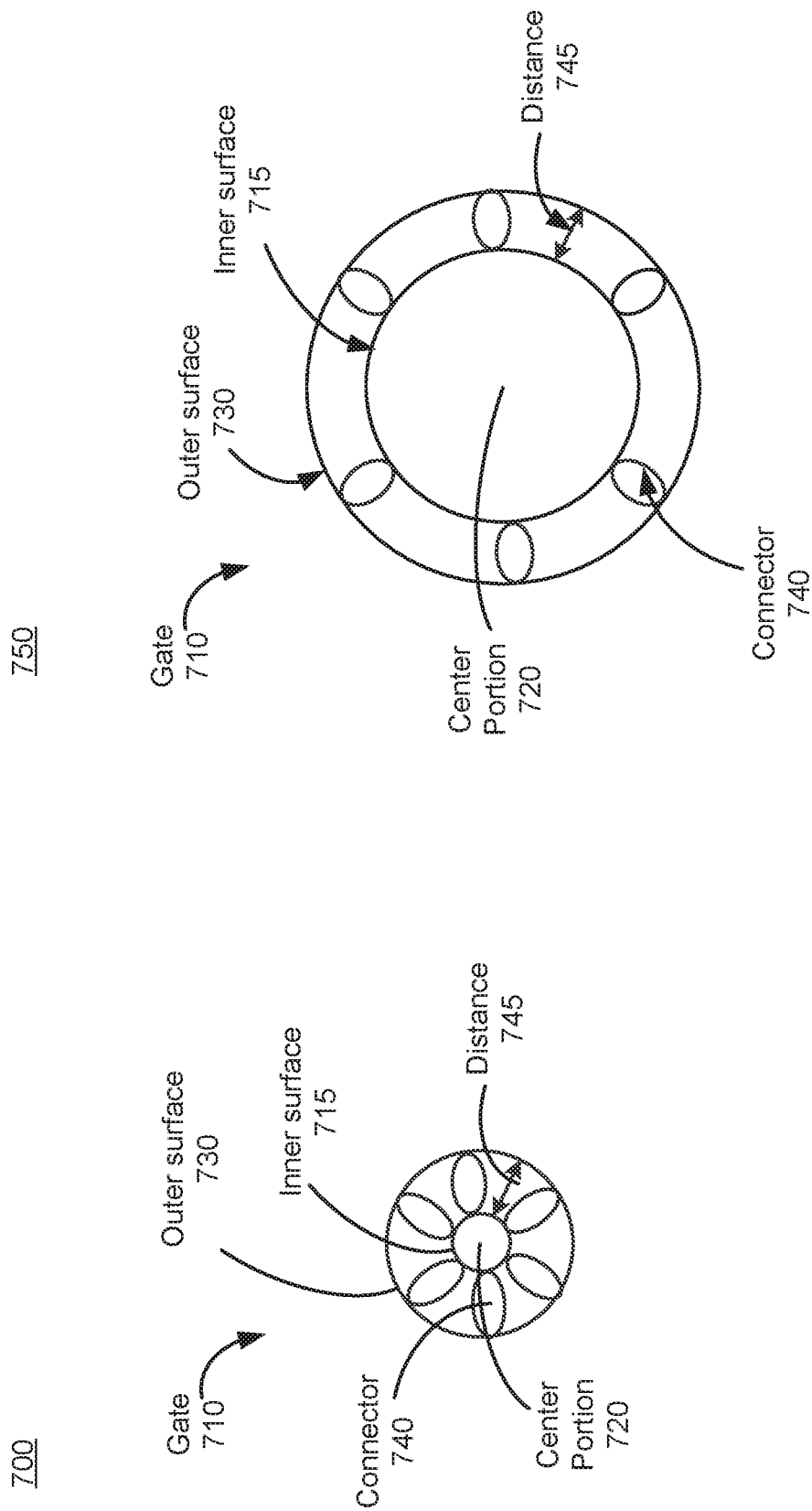
FIG. 7A is a cross section of an example gate designed to constrict a channel with the gate at a low pressure state, in accordance with an embodiment.
FIG. 7B is the cross section of the example gate shown in FIG. 7A with the gate at a high pressure state, in accordance with an embodiment.
Figure 8:
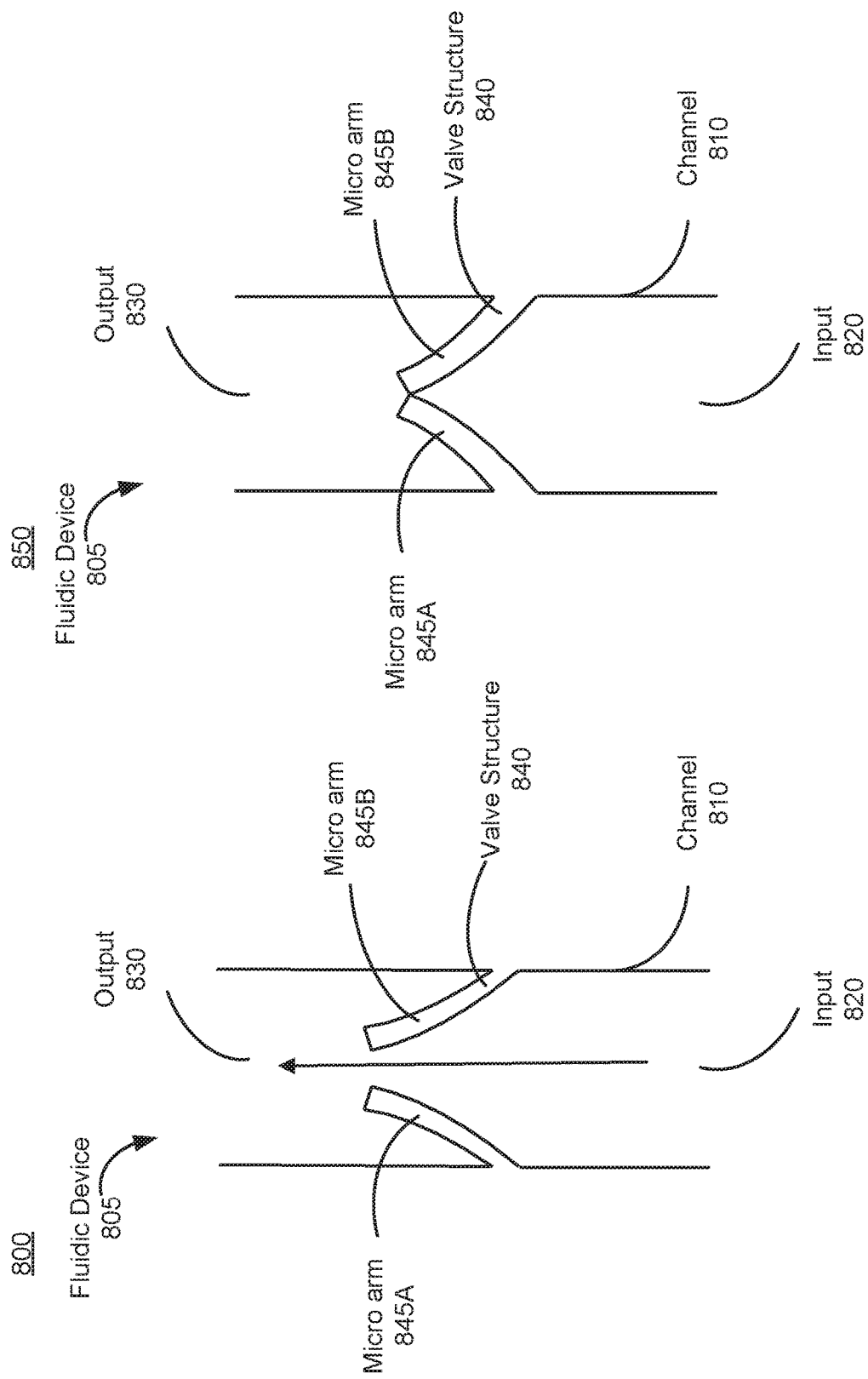
FIG. 8A is a cross section of an example fluidic device with a channel being open, in accordance with an embodiment.
FIG. 8B is a cross section of the example fluidic device shown in FIG. 8A with the channel being closed, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Embodiments of the disclosed invention include fluidic devices used in Virtual Reality (VR), augmented reality (AR) systems, and/or mixed reality (MR) systems. Fluidic devices are fluid handling devices that function analogous to electronic devices (e.g., an electrical transistor, an electrical diode, a resistor, a capacitor, etc.). For example, a fluidic device may be designed such that operates as a fluidic transistor. Additionally, fluidic devices are composable, meaning that fluidic devices may be coupled together to form a composite fluidic device (e.g., a decoder). In some embodiments, groups of fluidic devices are coupled together to act as controllers for a haptic apparatuses on wearable devices (e.g., haptic gloves) for a VR system.

A fluidic device generally includes a channel that includes an input (e.g., a source) and an output (e.g. a drain). The channel directs a fluid (e.g., liquid or gas) from the input to the output. The fluidic device also includes a gate that affects the flow of fluid in the channel. For example, in some embodiments, once a threshold gate pressure is achieved (i.e., a high pressure state) the gate may restrict the fluid flow in the channel. In alternate embodiments, the flow in the channel is restricted until a threshold pressure (i.e., the high pressure state) in the gate is achieved.

In one embodiment, a wearable device is implemented in a system for providing VR, AR, MR, or some combination thereof, experience to a user who wears the device. In more detail, the wearable device providing haptic feedback to the user in response to instructions from a console of the system. The wearable device includes at least one actuator, and a controller. The controller is composed of a plurality of fluidic devices. In some embodiments, the fluidic devices are coupled together to form one or more composite fluidic devices. For example, a composite device may be a decoder that is used to address the at least one actuator.

System Overview

A composite fluidic device is a device formed from a plurality of fluidic devices that are coupled together to form a fluidic circuit (i.e., performs a logical operation). A fluidic device is a fluid handling device that functions analogous to electronic devices (e.g., an electrical transistor, an electrical diode, etc.). For example, a fluidic device may be designed to operate as a fluidic transistor (analogous to an electrical transistor), a fluidic diode (analogous to an electrical diode), a fluidic leaky diode, etc. Various embodiments of fluidic devices are discussed in detail below with regard to FIGS. 2-8.

Additionally, the fluidic devices are "composable," in that a plurality of fluidic devices may be coupled together to generate larger structures. As a fluidic device may be designed to operate as, e.g., a fluidic transistor, multiple fluidic devices can be coupled together to create a composite device that performs certain logical functions in a manner analogous to electrical transistors being used together to form electrical circuits that perform logical functions (e.g., AND gate). Accordingly, a composite fluidic device may perform various logic functions including, e.g., an AND function, a NOT function, a NAND function, an OR function, a NOR function, an exclusive OR function, some other logical function, or some combination thereof. Moreover, multiple composite devices can be coupled together to form even larger fluidic circuits (e.g., a decoder, a controller in a haptic glove, etc.). An embodiment of a composite fluidic device designed to operate as a decoder is discussed in detail below with regard to FIG. 9. The composite fluidic device may be structured to perform combination logic, sequential logic, or both, or it may be configured to pass values (e.g. a pass transistor or a pass-gate).

FIG. 1 is an example diagram of a composite fluidic device 100, in accordance with an embodiment. The composite fluidic device 100 includes a high pressure rail 110, a low pressure rail 120, one or more fluidic devices 130A and 130B, an input interface 142 and an output interface 144. The composite fluidic device 100 shown in FIG. 1 is merely one example, and in alternative embodiments not shown, the composite fluidic device 100 may include additional/fewer or different fluidic devices between the high pressure rail 110 and the high pressure rail 120. Likewise, the various entities of the composite fluidic device 100 may differ in different embodiments.

The high pressure rail 110 is a structure that provides a fluid at a fixed pressure. The structure is made out of a material that does not readily deform at this pressure, or in another embodiment it is sufficiently capacitive that deformation is does to render the device faulty. For example, the structure may be composed of, e.g., high-durometer PDMS and other polymers. In some embodiments, the structure may be flexible. The structure may have a circular cross section, a rectangular cross section, or some other cross section. Alternatively, the structure may be rigid or semi-rigid. The fixed pressure is relatively constant. In some embodiments, the high pressure rail 110 is connected to pressurized fluid source, one or more pumps, or some other device that may be used to ensure the fluid in the high pressure rail 110 is at the first pressure. The fluid may be a liquid or a gas. For example, the fluid may be water, deionized water, alcohol, oil, standard hydraulic fluids, air, and nitrogen. The pressure of fluid in the high pressure rail 110 is analogous to a rail voltage for a transistor in an electrical system, such that fluid flows away from the high pressure rail 110 toward areas with lower pressure much in the same way that a rail voltage provide potential for other parts of an electrical circuit. For example, a typical operating pressure of the fluid in the high pressure rail 110 can be 1-100 PSI (pounds per square inch).

The low pressure rail 120 is another structure that transmits the fluid. The low pressure rail 120 provides the fluid at a second pressure that is lower than the first pressure, and is generally at the lowest pressure within the composite fluidic device 100. The structure is made out of a material that does not deform at the first pressure. For example, the structure may be composed of, e.g., high-durometer PDMS, and other polymers. The low pressure rail 120 generally functions as a low pressure zone such that fluid from other parts of the composite fluidic device 100 coupled to the low pressure rail 120 flows toward the low pressure rail 120. The pressure of fluid in the low pressure rail 120 is analogous to an electrical ground in an electrical system. For example, the pressure of the fluid in the low pressure rail 120 can range from vacuum to 15 PSI. In one embodiment, the upper end of the low pressure rail pressure value can be defined as a difference from the high pressure rail, and in this case it could be, e.g., 5 PSI below the high rail regardless of the absolute pressure value of the high rail.

The fluidic devices 130A, 1306 are fluidic devices that function analogous to transistors in electrical systems, for example, a P-channel field-effect transistor (PFET), or an N-channel field-effect transistor (NFET). As shown in FIG. 1, each of the fluidic devices 130A, 10306 includes a source, a drain, and a gate. In some embodiments, there is a channel filled with fluid between the source and the drain, and the pressure of the fluid in the source is higher than the pressure of the fluid in the drain, allowing the flow in the channel to flow from the source to drain when the channel is open. In one embodiment, when the gate is at a low pressure state, the channel is open; and when the gate is at a high pressure state, the channel is closed. In another embodiment, when the gate is at a high pressure state, the channel is in an open state; and when the gate is at a low pressure state, the channel is in a closed state.

An "open" state of the channel refers to a state when the fluid in the channel is flowing from one end (e.g., the source) to the other end (e.g., the drain) at some open threshold rate. For example, the open threshold rate may be 10 cc/s. The measurement "eels" used throughout the specification refers to "cubic-cm/sec." In contrast, a "closed" state of the channel refers to the state when the flow of fluid in the channel is less than some closed threshold rate. In some embodiments, the closed threshold rate may be zero flow. Alternatively, the closed threshold rate may be some rate of flow that is lower than the open threshold rate. For example, the closed threshold rate may be 0.1 cc/s. In addition, a "transitionary" state occurs when the channel transitions from an open state to a closed state or from a closed state to an open state. The "open" state of the channel is also referred to as an "ON" condition of a fluidic device, and the "closed" state of the channel is also referred to as an "OFF" condition of a fluidic device.

A "high pressure" and "low pressure" described here depends on the fluidic device structures and pressure of the fluid filling the fluidic device. In general, a "low pressure" is a pressure of the fluid that falls within a low pressure range, and a "high pressure" is a pressure of the fluid that falls within a high pressure range. The low pressure range may be thought of as a "0" and the high pressure range may be thought of as a "1." Accordingly, the fluidic devices 130A, 130B may operate digitally using the fluid at different pressures. Moreover, different components of a fluidic device may have different high pressure ranges and different low pressure ranges. For example, a high pressure range of a gate may be significantly less than a high pressure range of a source. The range of response times for a channel to open or close can be from 0.1 ms to 30 ms.

The input interface 142 is an interface that enables the fluidic devices 130A, 130B to receive inputs. In one embodiment, an input to the fluidic device 130 is fluid at a certain pressure that is applied to certain parts of the fluidic device that can cause the fluidic device to be either an "ON" or "OFF" condition. As one example, the input may be fluid at a certain pressure that is applied to the gates of the fluid devices 130A, 130B. Similarly, the output interface 144 is an interface that enables the fluidic devices 130A, 130B to provide outputs.

FIGS. 2A-5B show various embodiments of fluidic devices in the condition that when the gate is at a high pressure state, the channel is closed and the fluidic devices are in an "OFF" condition.

FIG. 2A is cross section 200 of an example fluidic device 205 including a gate 210 designed to constrict a channel 220, the gate 210 at a low pressure state, in accordance with an embodiment. The fluidic device 205 shown in FIG. 2A and FIG. 2B transits from an open state to a closed state by increasing fluid pressure at the gate 210, as more fully described below. The fluidic device 205 includes the gate 210, and a channel 220 that receives fluid flowing from a source 230 and outputs the fluid to a drain 240. In some embodiments, the fluidic device 205 is the fluidic device 130A or 130B shown in FIG. 1. In one embodiment, the source 230, the drain 240 and the gate 210 are functioning analogous to the source, drain and gate in a field effect transistor in an electrical system.

The channel 220 connects two ends that are referred to the source 230 and the drain 240, and the channel 220 is filled with a fluid (e.g., liquid or gas). In one embodiment, the channel 220 can be a flexible tube filled with fluid. The channel 220 may have different types of shapes, sizes and/or be made from different materials. As one example, the cross section of the channel 220 may be circular, elliptical, square, rectangular, etc. Portions of the channel 220 adjacent to the gate may also deform to change to a different shape when pressure is applied by the gate 210. The channel 220 may be composed of materials such as silicone (a type of elastomer), plastic, etc., and example materials used are polymers such as PDMS). The size can range from 10 μm to 3 mm.

The gate 210 is a part of the fluidic device 205 and functions analogous to a gate of an electronic transistor in an electrical system. The gate 210 may have different shapes, sizes and/or may be made from different materials. As shown in FIG. 2A, the gate 210 has a circular cross section and encircles the channel 220. The gate 210 may be inflated by increasing the pressure of fluid within the gate 210. Similarly, the gate 210 may be deflated by decreasing the pressure of fluid within the gate 210. The gate 210 is also positioned close to the channel 220. For simplicity, the input to the gate 210 is not shown in FIG. 2A. In some embodiments, the input to the gate 210 may be from some other fluidic device. Likewise, in some embodiments, the gate 210 has an output that is also not shown, and the output of the gate 210 may be coupled to other fluidic devices.

As shown in FIG. 2A, while the gate 210 is in a low pressure state, the channel 220 between the source 430 and the drain 440 is open and the fluidic device 205 is in an "ON" condition, allowing fluid in the channel to flow from the source 230 to the drain 240. An example pressure range for making a low pressure state is 0-5 PSI.

FIG. 2B is a cross section 250 of the example fluidic device 205 shown in FIG. 2A with the gate 210 at a high pressure state, in accordance with an embodiment. In FIG. 2B, the fluid pressure within the gate 210 is at a high pressure, and at pressurized fluid is such that the gate 210 has expanded to pinch the channel 220. The pinched channel 220 is deformed and reduces the flow rate in the channel 220 to a closed threshold rate such that the fluidic device 205 is in an "OFF" condition. An example pressure range for making a high pressure state is 10-100 PSI.

During a transitionary period (not shown), the gate 210 gradually expands (with increasing pressure) to pinch the channel 220, the part of the channel that is being pinched by the gate 210 gradually deforms to slow (and possibly block) the fluid flowing from the source 230 to the drain 240. When the fluid flow reaches a closed threshold value, the fluidic device 205 is in an "OFF" condition.

In alternative embodiments not shown in FIG. 2A-2B, the gate 210 may not have a flexible shape that can expand or shrink with the different pressure applied within the gate. In this case, instead of expanding to close the channel 220, extra pressure from outside the gate 210 may be applied to the gate to make the gate move toward the channel to pinch the channel, causing the channel to deform and to be closed.

FIG. 3A is a cross section 300 of an example fluidic device 305 including a gate 310 designed to regulate fluid flow through a channel 320, with the gate 310 at a low pressure state, in accordance with an embodiment. The fluidic device 305 shown in FIG. 3A and FIG. 3B transits from an open state to a closed state by increasing fluid pressure at the gate 310, as more fully described below. The fluidic device 305 includes the gate 310, and a channel 320 that receives fluid flowing from a source 330 and outputs the fluid to a drain 340. In some embodiments, the fluidic device 305 is the fluidic device 130A or 130B shown in FIG. 1.

Similar to the fluidic device 205 shown in FIG. 2A-2B, the channel 320 of the fluidic device 305 can have different types of shapes, sizes and can be made from different kind of materials. Different from the fluidic device 205 shown in FIG. 2A-2B, the gate 310 in FIGS. 3A-3B is a pair of micro arms 345A, 345B that are positioned within the channel 320 instead of external to the channel. In one embodiment, the gate 310 has a fixed shape and is not flexible. The gate 310 may be made from different materials. For example, the gate 310 may also be a fluidic device filled with fluid but the amount of the fluid and the pressure within the gate can be controlled to make the gate a fixed shape and size. For another example, the gate 310 may be made from other materials that are not flexible. Accordingly, the gate 310 cannot shrink or expand.

As shown in FIG. 3A, when the gate 310 is in a low pressure state, the pair of micro arms 345A, 345B are separated from each other, allowing fluid to flow at an open threshold rate through the channel 320 such that the fluid device 305 is in an "ON" condition.

FIG. 3B is a cross section 350 of the example fluidic device 305 shown in FIG. 3A, with the gate 310 at a high pressure state, in accordance with an embodiment. During a transitionary period (not shown), pressure is increased at the gate 310 causing the micro arms 345A, 345B to move towards each other. Once the gate pressure reaches a high pressure state, the micro arms 345A, 345B have reduced the pressure within the channel 320 to a low pressure state. In some embodiments, a low pressure state is such that there is zero flow rate of the fluid between the source 330 and the drain 340. When the fluid flow in the channel 320 reaches a closed threshold value, the channel 320 the fluidic device 305 is in an "OFF" condition.

FIG. 4A is a cross section 400 of an example fluidic device 405 including a gate 410 and a rigid body 445, with the gate 410 at a low pressure state, in accordance with an embodiment. The fluidic device 405 shown in FIGS. 4A-4B transits from an "ON" condition to an "OFF" condition when pressure in the gate 410 is increased to a high pressure state. The fluidic device 405 includes the gate 410, a channel 420 that receives fluid flowing from a source 430 and outputs the fluid to a drain 440. In some embodiments, the fluidic device 405 is the fluidic device cccc 130A or 130B shown in FIG. 1.

The fluidic device 405 also includes a rigid body 445 that has a relatively wide side 446 and a relatively narrow side 447, and thus facilitates a concentration of force applied over the wide side 446 to the portion of the channel in contact with the narrow side 447. The rigid body 445 is positioned between the channel 420 and the gate 410 with the narrow side 447 adjacent to the channel 420 and the wide side 446 adjacent to the gate 410. The rigid body 445 is generally composed of a material that is less deformable than the channel 420, such that the channel pressing against the rigid body 445 reduces the fluid flow rate within the channel 420. If pressure is increased within the gate 410 to a closed threshold pressure, the increased pressure causes the rigid body 445 to pinch the channel 420 to cause a corresponding drop in the fluid flow rate within the channel 420. With this configuration of the rigid body 445, a relatively small pressure applied on the gate 410 and transferred to the wide part 446 of the rigid body results in a relatively large pressure that the narrow part 447 of the rigid body applies to the channel 420. In some embodiments, the ratio of areas between the wide side 446 of the rigid body 445 and the narrow side 447 of the rigid body partly determines how much pressure that should be applied to the gate 410 to close the channel 420.

Similar to the fluidic devices shown in FIGS. 2A-3B, the channel 420 of the fluidic device 405 can have different types of shapes, sizes and can be made from different kind of materials. As described above, the gate 410 is positioned adjacent to the wide side 446 of the rigid body 445. As shown in FIG. 4A, when the gate 410 is in a low pressure state, the gate does not push the rigid body 445 to pinch the channel 420, allowing the fluid within the channel 420 to flow at an open threshold rate (i.e., the fluid device 405 is in an "ON" condition).

FIG. 4B is a cross section 450 of the example fluidic device 405 shown in FIG. 4A, with the gate 410 at a high pressure state, in accordance with one embodiment. In FIG. 4B, the pressure applied to the gate 410 is large enough to cause the gate 410 to push towards the rigid body 445, and to further make the narrow side 447 of the rigid body pinch the channel 420, which makes the channel to deform to reduce the flow of the fluid inside the channel. As the pressure applied to the gate 410 increases, the flow in the channel 420 is reduced. Once the gate 410 reaches a high pressure state, the fluid in the channel 420 is at a closed threshold rate, and the fluidic device 405 is in an "OFF" condition.

FIG. 5A is a cross section 500 of an example fluidic device 505 including a gate 510 and a rigid body 545, with the gate 510 at a low pressure state, in accordance with an embodiment. The fluidic device 505 shown in FIGS. 5A-5B transits from an "ON" condition to an "OFF" condition when pressure in the gate 510 is increased to a high pressure state. The fluidic device 505 includes the gate 510, a channel 520 that receives fluid flowing from a source 530 and outputs the fluid to a drain 540. In some embodiments, the fluidic device 505 is the fluidic device 130A or 130B shown in FIG. 1.

The fluidic device 505 also includes a rigid body 545 positioned external and adjacent to the channel 520. The rigid body 545 is generally composed of a material that is less deformable than the channel 520, such that the channel pressing against the rigid body 545 reduces the fluid flow rate within the channel 520. The rigid body may have a triangular cross section, or some other cross section. The gate 510 comprises at least one chamber whose volume expands with fluid pressure within the chamber. If pressure is increased at the gate 510 to a closed threshold pressure, the increased pressure causes the gate 510 to expand and place pressure on the channel 520, thereby causing the channel 520 to move towards the rigid body 545, and the shape of the rigid body 545 causes a corresponding drop in the fluid flow rate within the channel 520.

Similar to the fluidic devices shown in FIGS. 2A-4B, the channel 520 of the fluidic device 505 can have different types of shapes, sizes and can be made from different kind of materials. The gate 510 includes one or more locations (e.g., 547A, 547B) that are positioned external to the channel 520 and opposite to the rigid body 545. In one embodiment, the gate 510 is coupled to a wall of the channel 520 at the locations 547A, 547B, in a manner where an increased fluid pressure in the gate 510 causes gate 510 expansion which results in a force towards the side of the channel 520 that is adjacent to the rigid body 545. As shown in FIG. 5A, when the gate 510 is in a low pressure state, the gate (two blocks) does not expand towards the channel 520 to pinch the channel 520, allowing the fluid within the channel 520 to flow at an open threshold rate (i.e., the fluid device 505 is in an "ON" condition).

FIG. 5B is a cross section 550 of the example fluidic device 505 shown in FIG. 5A, with the gate 510 at a high pressure state, in accordance with one embodiment. In FIG. 5B, the pressure applied to the gate 510 is large enough to cause the gate 510 to expand towards the channel 520, and with the rigid body 545 in a fixed position, the part of the channel that is pressed by the rigid body 545 is deformed to reduce the flow rate of the fluid in the channel 520. As the fluid pressure of the gate 510 increases, the flow in the channel is reduced. Once the gate 510 reaches a high pressure state, the fluid in the channel 520 is at a closed threshold rate, and the fluidic device 505 is in an "OFF" condition.

FIG. 6A through FIG. 7B show various embodiments of fluidic devices in the condition that when a gate is at a high pressure state, the channel is open and the fluidic device is in an "ON" condition.

FIG. 6A is a cross section 600 of an example fluidic device 605 including a gate 610 designed to constrict a channel 620 with the gate at a low pressure state, in accordance with an embodiment. The fluidic device 605 shown in FIG. 6A-6B transits from an "OFF" condition to an "ON" condition after a pressure at the gate 610 reaches a high pressure state. The fluidic device 605 includes the gate 610, a channel 620 that receives fluid flowing from a source 630 and outputs the fluid to a drain 640. In some embodiments, the fluidic device 605 is the fluidic device 130A or 130B shown in FIG. 1.

Similar to the fluidic devices shown in FIGS. 2A-5B, the channel 620 of the fluidic device 605 can have different types of shapes, sizes and can be made from different kinds of materials. The gate 610 may have different types of shapes, sizes or be made from different materials. As shown in FIG. 6A, the gate 610 is shaped like a ring that circumscribes a portion of the channel 620. The gate 610 further includes an outer ring 642 and an inner ring 645. The outer ring 642 is positioned surrounding the channel 620 and the inner ring 645 is positioned within the channel 620. The inner ring 645 comprises an aperture with a diameter. In one embodiment, the gate 610 has a relatively flexible shape and deforms with increasing fluid pressure in the gate 610. The amount of the fluid within the gate 610 can be adjusted by varying the fluid pressure in the gate 610. After pressure of the fluid inside the gate 610 is increased, the diameter of the aperture of the inner ring 645 increases, allowing fluid to flow through the aperture of the inner ring 645, and thereby allowing fluid to flow through the channel 620 between the source 630 and the drain 640, as more fully described below in FIG. 6B.

As shown in FIG. 6A, when the gate 610 is in a low pressure state, the diameter of the aperture of the inner ring 645 is a first distance, such that the flow rate in the channel 620 is at a closed threshold rate, and the fluidic device 605 in an "OFF" condition.

FIG. 6B is a cross section 650 of the example fluidic device 605 shown in FIG. 6A, with the gate 610 at a high pressure state, in accordance with one embodiment. In FIG. 6B, a pressure of the fluid in the outer ring 642 of the gate 610 is increased, thereby deforming the channel 620 and causing the diameter of the aperture of the inner ring 645 to increase to a second distance that is greater than the first distance. As the diameter of the aperture of the inner ring 645 increases, the flow rate of the fluid in the channel 620 from the source 630 to the drain 640 increases. Once the flow rate is at the open threshold rate, the fluidic device 605 is in an "ON" condition.

FIG. 7A is a cross section 700 of a gate 710 that constricts a channel (not shown), with the gate 710 at a low pressure state, in accordance with an embodiment. The gate 710 shown in FIGS. 7A-7B transits from an "OFF" condition to an "ON" condition when pressure is applied to the gate 710 causing an inner surface 715 of the gate 710 to increase. Only the cross section of the gate 710 is shown in FIG. 7A to simplify the description. A channel (not shown) may run through a center portion 720 of the gate 710. The channel's diameter may nominally be larger than the diameter of the center portion illustrate in FIG. 7A, such that a flow rate of a fluid in the channel is at a closed threshold rate, and a fluidic device would be in an "OFF" condition.

The gate 710 may have different types of shapes, sizes or be made from different materials. As shown in FIG. 7A, the gate 710 is shaped like a ring that would be positioned around and against a channel. The gate 710 further includes an outer surface 730 and multiple connectors 740 connecting the outer surface 730 and the inner surface 715. In some embodiments, the multiple connectors 740 are rigid objects that have a fixed shape and size and do not deform with increased fluid pressure within the gate 710. The multiple connectors 740 maintain a fixed distance 745 between the outer surface 730 and the inner surface 715 with connectors 740 with increasing pressure in the gate 710.

FIG. 7B is the cross section of the example gate 710 shown in FIG. 7A with the gate 710 at a high pressure state, in accordance with an embodiment. As fluid pressure is increased at the gate 710, the gate 710 expands. As described above in FIG. 7A, the multiple rigid connectors 740 connect the outer surface 730 and the inner surface 715 such that the distance 745 remains fixed with increases in fluid pressure in the gate 710. The increased fluid pressure causes the expansion of the outer surface 730 and the expansion of the inner surface 715, thereby increasing the size of the center portion 720. A fluid flow rate through the center portion 720 would then increase as it would be less restricted. Once the flow rate of the channel reaches an open threshold rate, a corresponding fluidic device would be in an "ON" condition.

FIG. 8A is a cross section of an example fluidic device 800 designed to operate as a valve, in accordance with an embodiment. A valve allows flow in one direction, but may block reverse flow past a threshold rate. For example, the fluidic device 800 includes a channel 810 and allows flow from an input 820 towards an output 830. Fluid flowing from the input 820 towards the output 830 is a result of a positive pressure gradient (i.e., a pressure is higher at the input 820 than at the output 830). However, the fluidic device 800 blocks fluid flow from the output 830 toward the input 820 past a threshold flow rate. Fluid flow from the output 830 toward the input 820, also referred to as a reverse flow, is a result of a negative pressure gradient (i.e., a pressure is lower at the input 820 than at the output 830). Similar to the embodiments shown in FIG. 2A through FIG. 7B, the channel 810 can have different types of shapes, sizes and/or be made from different materials.

The fluidic device 800 includes a valve structure 840. The valve structure 840 comprises a pair of micro arms 845A and 845B that are positioned within the channel 810. When a flow rate from the output 830 towards the input 820 exceeds some threshold value, the micro arm 845A contacts the micro arm 845B within the channel, thereby closing the valve structure 840. In one embodiment, the value structure 840 may be composed from, e.g., materials such as silicone or plastic. The valve structure 840 may have a relatively fixed shape, in which case the valve structure 840 does not expand or shrink, and simply close off the fluid flow if a reverse fluid flow occurs that is more than the threshold value.

As shown in FIG. 8A, when a fluid flow rate from the output 830 towards the input 820 is below a threshold value, the pair of micro arms 845A, 845B are separated from each other, allowing fluid to flow at an open threshold rate through the channel 810 such that the fluid device 805 is in an "ON" condition. Different from the embodiments shown in FIGS. 2A-2B through FIGS. 7A-7B, the fluidic device 800 shown in FIG. 8A functions analogous to a diode instead of field-effect transistors. Moreover, by designing the valve structure 840 to allow reverse flow up to a particular threshold value, the fluidic device 800 may operate analogous to a leaky diode. In FIG. 8A, the channel 810 is open, and the fluidic device 800 is in an "ON" condition.

FIG. 8B is the example fluid device 805 shown in FIG. 8A with the channel 810 being closed, in accordance with an embodiment. As shown in FIG. 8B, there is a negative pressure gradient that causes the pair of micro arms 845A, 845B to move towards another (and in some embodiments contact one another), causing the valve structure 840 to close, and thereby closing the channel 810. In FIG. 8B, the channel 810 is closed, and the fluidic device 800 is in an "OFF" condition.

Figure 9:
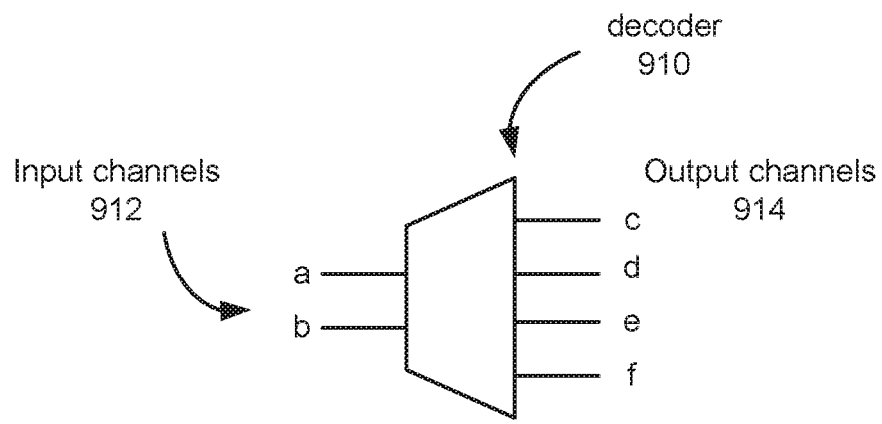
FIG. 9 is an example decoding logic, in accordance with an embodiment.

FIG. 9 is an example decoding logic 900, in accordance with an embodiment. The decoding logic 900 shown in FIG. 9 further includes a decoder 910 and a decoding table 950. The decoder 910 may be a custom decoder implemented by various combinations of the fluidic devices shown in FIGS. 2A-2B through FIGS. 8A-8B that are coupled together and one or more high pressure rails and low pressure rails. The decoder 910 may be generated in a similar manner as one skilled in the art assembles decoder using electrical transistors.

In this example, the decoder 910 includes two input channels 912, namely, 'a' and 'b;' and four output channels 914, namely, 'c', 'd', 'e', and 'f'. In alternative embodiments not shown, a decoder can have different numbers of input channels and output channels. For example, the decoder 910 may have N input channels and 2^N output channels. Additionally, other kinds of decoding logic other than the one shown in FIG. 9 can also be implemented by the fluidic devices shown in FIGS. 2A-2B through FIGS. 8A-8B.

In some embodiments, as described above in FIG. 1, the inputs received by the input channels 912 are a fluid at different pressures, and the values of the inputs may be pressure values. In one embodiment, the outputs provided by the output channels 914 may also be a fluid at certain pressures, and the values of the outputs may be pressure values. In another embodiment, analogous to a decoder in an electrical system, a specific output channel 914 is selected out according to the combination of the inputs received in the input channels. Different combinations of the pressure values received in the input channels 912 can result in different outputs, for example, different pressure values provided by the output channels 914 or a selection of an output channel from the plurality of output channels.

Figure 11:
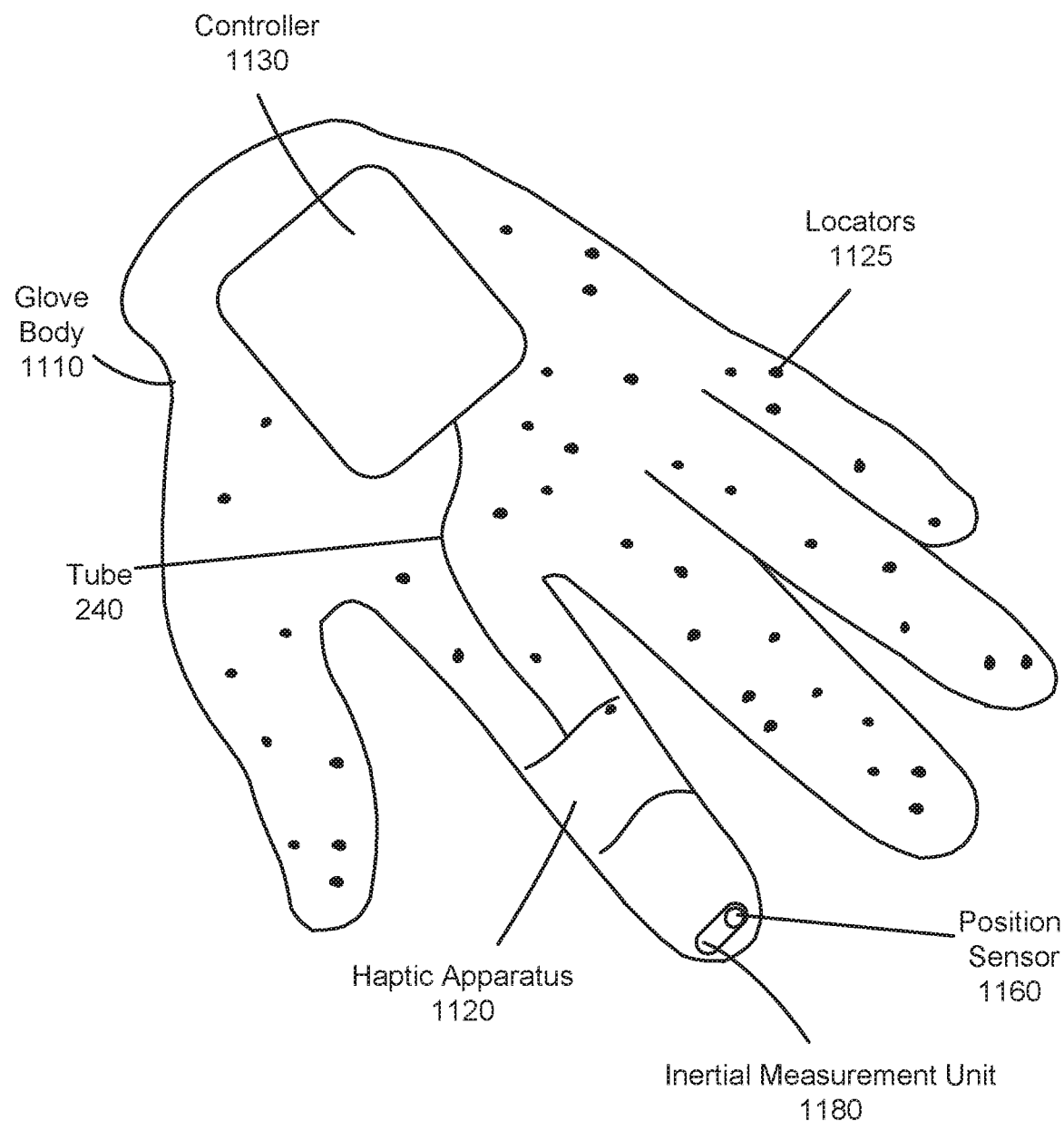
FIG. 11 is an example haptic glove for interacting with virtual objects, in accordance with an embodiment.

In one embodiment, the decoder 910 forming the decoding logic 900 is an instruction decoder that receives inputs in the form of fluid pressure and output as decoded instructions to address actuators included in a haptic assembly, for example, the haptic apparatuses 1120 (e.g., actuators) of the haptic glove 1100 shown in FIG. 11.

The decoding table 950 shown in FIG. 9 is an example table that reflects the permutations of inputs, namely, a and b, and corresponding outputs, namely, c, d, e and f. The example shown in FIG. 9 shows merely a demultiplexer, and it generates a one-hot logical output. In alternative embodiments not shown, other examples composed by the fluidic devices described above can include more sophisticated decoders, e.g. ones that hold state or generate complex output codes. Analogous to a truth table for a decoder in an electrical system, for example, the possible permutations for {a, b} can be {0,0}, {0,1}, {1,0} and {1,1}, and the corresponding outputs may be {1,0,0,0}, {0,1,0,0}, {0,0,1,0} and {0,0,0,1}. In this example, the status "1" for the inputs may indicate a high pressure and the status "0" for the inputs may indicate a low pressure. The status "1" for the outputs may indicate a selection of the corresponding output and the status "0" for the inputs may indicate the corresponding output is not selected. In alternative embodiments not shown, the permutations of the inputs and outputs can vary and the meanings of the inputs and outputs can also vary in different embodiments.

Figure 10:
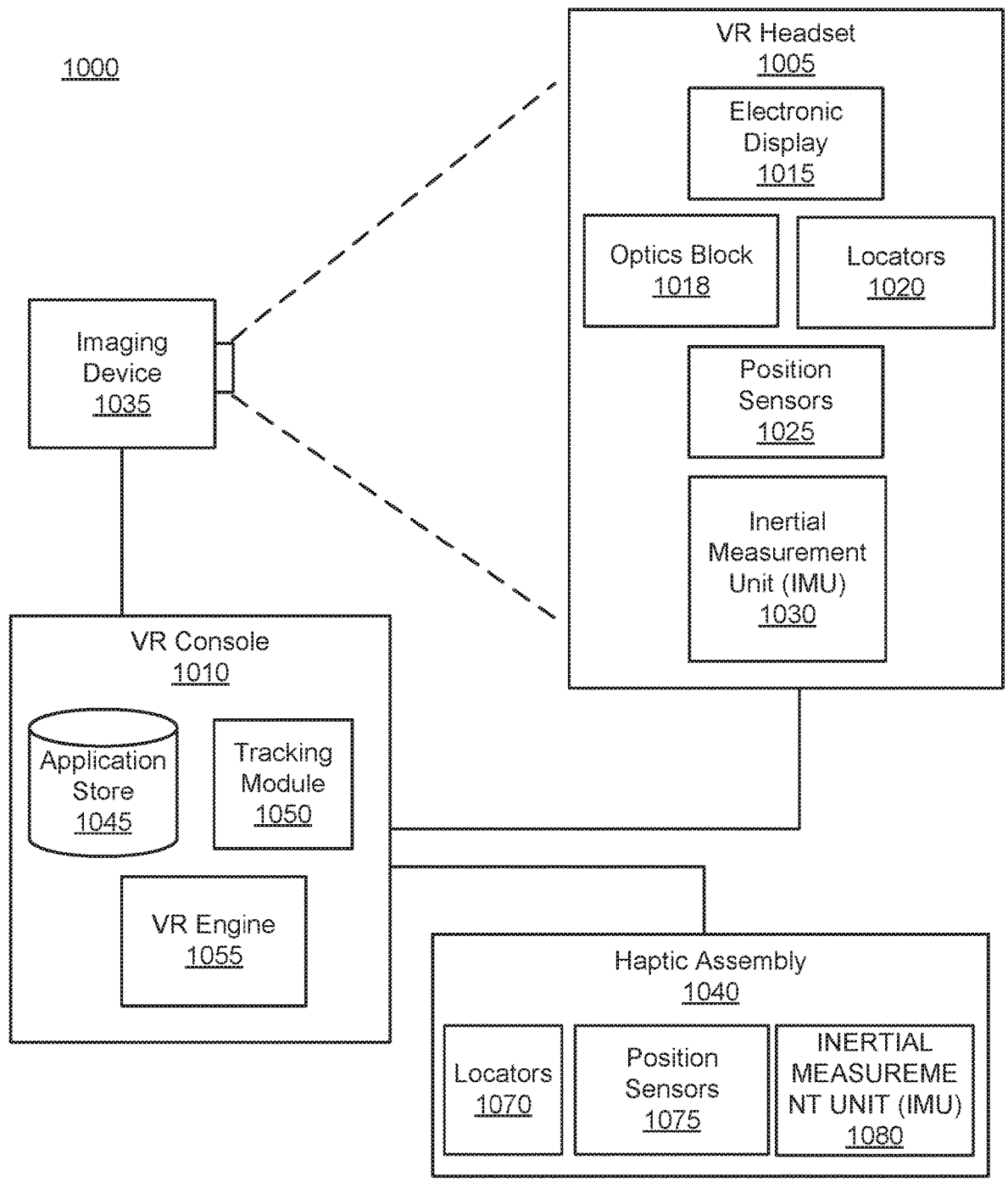
FIG. 10 is a block diagram of a system environment including a VR system, in accordance with an embodiment.

FIG. 10 is a block diagram of a system environment including a virtual reality (VR) system, in accordance with one embodiment. The system environment 1000 shown by FIG. 10 comprises a VR headset 1005, an imaging device 1035, and a haptic assembly 1040 that are each coupled to the VR console 1010. While FIG. 1 shows an example system 1000 including one VR headset 1005, one imaging device 1035, and one haptic assembly 1040, in other embodiments any number of these components may be included in the system 1000. For example, there may be multiple VR headsets 1005 each having an associated haptic assembly 1040 and being monitored by one or more imaging devices 1035, with each VR headset 1005, haptic assembly 1040, and imaging devices 1035 communicating with the VR console 1010. In alternative configurations, different and/or additional components may be included in the system environment 1000. Additionally, in some embodiments the VR system 1000 may be modified to include other system environments, such as an AR system environment.

The VR headset 1005 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 1005, the VR console 1010, or both, and presents audio data based on the audio information. The VR headset 1005 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the VR headset 1005 may also act as an augmented reality (AR) and/or mixed reality (MR) headset. In these embodiments, the VR headset 1005 augments views of a physical, real-world environment with computer-generated elements (e.g., images, video, sound, etc.).

The VR headset 1005 includes an electronic display 1015, an optics block 1018, one or more locators 1020, one or more position sensors 1025, and an inertial measurement unit (IMU) 1030.

The optics block 1018 magnifies received light from the electronic display 1015, corrects optical errors associated with the image light, and the corrected image light is presented to a user of the VR headset 1005. An optical element may be an aperture, a Fresnel lens, a convex lens, a concave lens, a filter, or any other suitable optical element that affects the image light emitted from the electronic display 1015. Moreover, the optics block 1018 may include combinations of different optical elements. In some embodiments, one or more of the optical elements in the optics block 1018 may have one or more coatings, such as anti-reflective coatings.

The locators 1020 are objects located in specific positions on the VR headset 1005 relative to one another and relative to a specific reference point on the VR headset 1005. A locator 1020 may be a light emitting diode (LED), a corner cube reflector, a reflective marker, a type of light source that contrasts with an environment in which the VR headset 1005 operates, or some combination thereof. In embodiments where the locators 1020 are active (i.e., an LED or other type of light emitting device), the locators 1020 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 1020 are located beneath an outer surface of the VR headset 1005, which is transparent to the wavelengths of light emitted or reflected by the locators 1020 or is thin enough to not substantially attenuate the wavelengths of light emitted or reflected by the locators 1020. Additionally, in some embodiments, the outer surface or other portions of the VR headset 1005 are opaque in the visible band of wavelengths of light. Thus, the locators 1020 may emit light in the IR band under an outer surface that is transparent in the IR band but opaque in the visible band.

The IMU 1030 is an electronic device that generates fast calibration data based on measurement signals received from one or more of the position sensors 1025. A position sensor 1025 generates one or more measurement signals in response to motion of the VR headset 1005. Examples of position sensors 1025 include: one or more accelerometers, one or more gyroscopes, one or more magnetometers, another suitable type of sensor that detects motion, a type of sensor used for error correction of the IMU 1030, or some combination thereof. The position sensors 1025 may be located external to the IMU 1030, internal to the IMU 1030, or some combination thereof.

Based on the one or more measurement signals from one or more position sensors 1025, the IMU 1030 generates fast calibration data indicating an estimated position of the VR headset 1005 relative to an initial position of the VR headset 1005. For example, the position sensors 1025 include multiple accelerometers to measure translational motion (forward/back, up/down, left/right) and multiple gyroscopes to measure rotational motion (e.g., pitch, yaw, roll). In some embodiments, the IMU 1030 rapidly samples the measurement signals and calculates the estimated position of the VR headset 1005 from the sampled data. For example, the IMU 1030 integrates the measurement signals received from the accelerometers over time to estimate a velocity vector and integrates the velocity vector over time to determine an estimated position of a reference point on the VR headset 1005. Alternatively, the IMU 1030 provides the sampled measurement signals to the VR console 1010, which determines the fast calibration data. The reference point is a point that may be used to describe the position of the VR headset 1005. While the reference point may generally be defined as a point in space; however, in practice the reference point is defined as a point within the VR headset 1005 (e.g., a center of the IMU 1030).

The IMU 1030 receives one or more calibration parameters from the VR console 1010. As further discussed below, the one or more calibration parameters are used to maintain tracking of the VR headset 1005. Based on a received calibration parameter, the IMU 1030 may adjust one or more IMU parameters (e.g., sample rate). In some embodiments, certain calibration parameters cause the IMU 1030 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 1035 generates slow calibration data in accordance with calibration parameters received from the VR console 1010. Slow calibration data includes one or more images showing observed positions of the locators 1020 that are detectable by the imaging device 1035. The imaging device 1035 may include one or more cameras, one or more video cameras, any other device capable of capturing images including one or more of the locators 1020, or some combination thereof. Additionally, the imaging device 1035 may include one or more filters (e.g., used to increase signal to noise ratio). The imaging device 1035 is designed to detect light emitted or reflected from locators 1020 in a field of view of the imaging device 1035. In embodiments where the locators 1020 include passive elements (e.g., a retroreflector), the imaging device 1035 may include a light source that illuminates some or all of the locators 1020, which retro-reflect the light towards the light source in the imaging device 1035. Slow calibration data is communicated from the imaging device 1035 to the VR console 1010, and the imaging device 1035 receives one or more calibration parameters from the VR console 1010 to adjust one or more imaging parameters (e.g., focal length, focus, frame rate, ISO, sensor temperature, shutter speed, aperture, etc.).

The haptic assembly 1040 is a device that allows a user to send action requests to the VR console 1010. An action request is a request to perform a particular action. For example, an action request may be to start or end an application or to perform a particular action within the application. The haptic assembly 1040 also provides haptic feedback including a perception of contacting a virtual object. In one embodiment, the haptic assembly 1040 includes a plurality of composable fluidic devices that form one or more composite fluidic devices. The composite fluidic devices may be used to, e.g., address actuators included in the haptic assembly 1040 according to the haptic feedback signal from the VR console 1010. In one embodiment, as more fully described below in FIG. 11, the haptic assembly 1040 is a haptic glove 1100 through which the VR console 1010 enables a user to interact with a virtual object.

In FIG. 10, the haptic assembly 1040 further includes locators 1070, one or more position sensors 1075, and an inertial measurement unit (IMU) 1080. In some embodiments, the locators 1070, one or more position sensors 1075, an inertial measurement unit (IMU) 1080 are installed to determine a physical position or movement of the haptic assembly 1040. In addition, the haptic assembly 1040 receives, from the VR console 1010, a haptic feedback signal corresponding to haptic feedback to the user. The haptic assembly 1040 provides to the user with the haptic feedback of touching a virtual object in a virtual space, according to the haptic feedback signal. Specifically, the haptic assembly 1040 prevents or enables a physical movement of a portion of a user in contact with the virtual object in the virtual space. For example, if a user's finger is in contact with a virtual object (e.g., a virtual wall) in a virtual space, the haptic assembly 1040 prevents a physical movement of the user finger to move in a direction through the virtual object in the virtual space. Accordingly, the user can receive a perception of contacting the virtual object.

In one embodiment, the haptic feedback signal indicates a position or a portion of the haptic assembly 1040 to be actuated, and an amount of actuation of the position or the portion of the haptic assembly 1040 for providing haptic feedback. In this embodiment, the amount of actuation is determined by, e.g., the VR console 1010, according to a virtual position of the haptic assembly 1040 corresponding to a physical position of the haptic assembly 1040 and a virtual position of a virtual object in a virtual space. The haptic assembly 1040 provides tactile perception of a user touching the virtual object according to the amount of actuation indicated by the haptic feedback signal.

The locators 1070 are objects located in specific positions on the haptic assembly 1040 relative to one another and relative to a specific reference point of the haptic assembly 1040 on the haptic assembly 1040. A locator 1070 is substantially similar to a locator 1020 except that a locator 1070 is part of the haptic assembly 1040. Additionally, in some embodiments, the outer surface or other portions of the haptic assembly 1040 are opaque in the visible band of wavelengths of light. Thus, the locators 1070 may emit light in the IR band under an outer surface that is transparent in the IR band but opaque in the visible band.

A position sensor 1075 generates one or more measurement signals in response to motion of the haptic assembly 1040. The position sensors 1075 are substantially similar to the positions sensors 1025, except that the position sensors 1075 are part of the haptic assembly 1040. The position sensors 1075 may be located external to the IMU 1080, internal to the IMU 1080, or some combination thereof.

Based on the one or more measurement signals from one or more position sensors 1075, the IMU 1080 generates fast calibration data of the haptic assembly 1040 indicating an estimated position of the haptic assembly 1040 relative to an initial position of the haptic assembly 1040. For example, the position sensors 1075 include multiple accelerometers to measure translational motion (forward/back, up/down, left/right) and multiple gyroscopes to measure rotational motion (e.g., pitch, yaw, roll) of the haptic assembly 1040. In some embodiments, the IMU 1080 rapidly samples the measurement signals and calculates the estimated position of the haptic assembly 1040 from the sampled data. For example, the IMU 1080 integrates the measurement signals received from the accelerometers over time to estimate a velocity vector and integrates the velocity vector over time to determine an estimated position of a reference point of the haptic assembly 1040. Alternatively, the IMU 1080 provides the sampled measurement signals to the VR console 1010, which determines the fast calibration data of the haptic assembly 1040. The reference point of the haptic assembly 1040 is a point that may be used to describe the position of the haptic assembly 1040. While the reference point of the haptic assembly 1040 may generally be defined as a point in space; however, in practice the reference point of the haptic assembly 1040 is defined as a point within the haptic assembly 1040 (e.g., a center of the IMU 1080).

The IMU 1080 receives one or more calibration parameters of the haptic assembly 1040 from the VR console 1010. As further discussed below, the one or more calibration parameters of the haptic assembly 1040 are used to maintain tracking of the haptic assembly 1040. Based on a received calibration parameter of the haptic assembly 1040, the IMU 1080 may adjust one or more IMU parameters (e.g., sample rate). In some embodiments, certain calibration parameters of the haptic assembly 1040 cause the IMU 1080 to update an initial position of the reference point of the haptic assembly 1040 so it corresponds to a next calibrated position of the reference point of the haptic assembly 1040. Updating the initial position of the reference point of the haptic assembly 1040 as the next calibrated position of the reference point of the haptic assembly 1040 helps reduce accumulated error associated with the determined estimated position.

The VR console 1010 provides media to the VR headset 1005 for presentation to the user in accordance with information received from one or more of: the imaging device 1035, the VR headset 1005, and the haptic assembly 1040. In the example shown in FIG. 1, the VR console 1010 includes an application store 1045, a tracking module 1050, and a virtual reality (VR) engine 1055. Some embodiments of the VR console 1010 have different modules than those described in conjunction with FIG. 1. Similarly, the functions further described below may be distributed among components of the VR console 1010 in a different manner than is described here.

The application store 1045 stores one or more applications for execution by the VR console 1010. An application is a group of instructions, that when executed by a processor, generates content for presentation to the user. Content generated by an application may be in response to inputs received from the user via movement of the VR headset 1005 or the haptic assembly 1040. Examples of applications include: gaming applications, conferencing applications, video playback application, or other suitable applications.

The tracking module 1050 calibrates the VR console 1010 using one or more calibration parameters and may adjust one or more calibration parameters to reduce error in determination of the position of the VR headset 1005. For example, the tracking module 1050 adjusts the focus of the imaging device 1035 to obtain a more accurate position for observed locators on the VR headset 1005. Moreover, calibration performed by the tracking module 1050 also accounts for information received from the IMU 1030. Additionally, if tracking of the VR headset 1005 is lost (e.g., the imaging device 1035 loses line of sight of at least a threshold number of the locators 1020), the tracking module 1050 re-calibrates some or all of the system environment 1000.

The tracking module 1050 tracks movements of the VR headset 1005 using slow calibration information from the imaging device 1035. The tracking module 1050 determines positions of a reference point of the VR headset 1005 using observed locators from the slow calibration information and a model of the VR headset 1005. The tracking module 1050 also determines positions of a reference point of the VR headset 1005 using position information from the fast calibration information. Additionally, in some embodiments, the tracking module 1050 may use portions of the fast calibration information, the slow calibration information, or some combination thereof, to predict a future location of the headset 1005. The tracking module 1050 provides the estimated or predicted future position of the VR headset 1005 to the VR engine 1055.

The VR engine 1055 executes applications within the system environment 1000 and receives position information, acceleration information, velocity information, predicted future positions, or some combination thereof of the VR headset 1005 from the tracking module 1050. Based on the received information, the VR engine 1055 determines content to provide to the VR headset 1005 for presentation to the user. For example, if the received information indicates that the user has looked to the left, the VR engine 1055 generates content for the VR headset 1005 that mirrors the user's movement in a virtual environment. Additionally, the VR engine 1055 performs an action within an application executing on the VR console 1010 in response to an action request received from the haptic assembly 1040 and provides feedback to the user that the action was performed. The provided feedback may be visual or audible feedback via the VR headset 1005 or haptic feedback via the haptic assembly 1040.

FIG. 11 is an example haptic glove 1100 for interacting with virtual objects, in accordance with an embodiment. The haptic glove 1100 shown in FIG. 11 includes a glove body 1110, a haptic apparatus 1120, a controller 1130, a tube 1140, one or more locators 1125, a position sensor 1160 and an IMU 1180. Only one tube 1140, one haptic apparatus 1120, one position sensor 1160 and one IMU 1180 are shown in FIG. 11 to simplify the description. In alternative embodiments not shown, the haptic glove 1100 can include multiple tubes, position sensors and haptic apparatus that are connected to the controller 1130, for example, for each finger of the haptic glove 1100, a set of haptic apparatus, position sensors and IMUS may be connected to the controller. Likewise, the functions performed by the various entities of the haptic glove 1100 may differ in different embodiments. Additionally, the various entities of the haptic glove 1100 may be positioned in different places on the glove body 1110. As one example, additional haptic apparatuses 1120 and the position sensors 1160 are located at different parts of the glove body 1110. As another example, the haptic apparatuses 1120 are coupled to or wrap the entire fingers of the glove body 1110. As another example, the controller 1130 is coupled to a different portion of the glove body 1110 corresponding to, for example a wrist or a palm.

The glove body 1110 is an apparatus covering a hand, for example, a garment that is coupled to the position sensor 1160, the haptic apparatus 1120, the controller 1130, and the tube 1140. In one embodiment, the position sensor 1160 is coupled to a corresponding finger of the glove body 1110 (e.g., a portion corresponding to a fingertip of the glove body); the haptic apparatus 1120 is coupled to a corresponding finger portion (e.g., a portion corresponding to a joint between two phalanges) of the glove body 1110; and the controller 1130 is coupled to a portion of the glove body 1110 corresponding to a back of a hand (i.e., dorsal side). The tube 1140 is coupled between the controller 1130 and the haptic apparatus 1120. In one embodiment, one or more of these components are placed beneath an outer surface of the glove body 1110, thus are not visible from the outside. Additionally or alternatively, some of these components are placed on an outer surface of the glove body 1110, and are visually detectable.

In one embodiment, the haptic glove 1100 may be the haptic assembly 1040 shown in FIG. 10 and the locators 1125, the position sensor 1160 and the IMU 1180 of the haptic glove 1100 may be the corresponding locators 1070, position sensors 1075 and IMUs 1080 of the haptic assembly 1040 shown in FIG. 10. A user's hand movement can be detected and tracked according to fast calibration data from the IMU 1180 and/or slow calibration of the locators 1125 from the imaging device 1035. Moreover, haptic feedback including a perception of a user contacting a virtual object can be provided to the user by the controller 1130, tube 1140, and haptic apparatus 1120.

The haptic apparatus 1120 provides haptic feedback including a perception of a user touching a virtual object. In one embodiment, the haptic apparatus 1120 is actuated according to instructions received from the controller 1130. In one embodiment, the haptic apparatus 1120 is coupled to a portion corresponding to a joint between two phalanges of the glove body 1110. In another embodiment, the haptic apparatus 1120 covers the entire glove body 1110 or are placed on other parts (e.g., an area corresponding to a joint between two different fingers) of the glove body 1110. The haptic apparatus 1120 may be, for example, a plurality of actuators.

The controller 1130 is a device that provides instructions for the haptic apparatus 1120 to perform specific functions. The controller 1130 may receive instructions or haptic feedback from the VR console 1010 and actuates the haptic apparatus 1120 accordingly. The controller 1130 includes a plurality of fluidic devices that generate instructions for one or more haptic apparatuses (e.g., actuators). As discussed in detail above, with regard to FIGS. 1 and 9 fluidic devices are composable and may be coupled together to form composite fluidic devices, like, e.g., a decoder. Decoders, for example, can help reduce a number of logical connections within the controller 1130 and/or connections to the haptic apparatus 1120. Accordingly, the controller 1130 may be composed of a plurality of fluid devices, including various combinations of those described above with regard to FIGS. 2A-9.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method of operating a fluidic device, comprising:
   transporting fluid through a channel from a source to a drain;
   controlling a rate of fluid flow between the source and the drain with a gate based on fluid pressure within the gate, comprising:
      inducing a first flow rate of the fluid in the channel at a low pressure state of the gate; and
      inducing a second flow rate of the fluid in the channel at a high pressure state of the gate; and
   directing the fluid from the drain to a decoder to provide an input pressure value to the decoder, wherein the first flow rate provides a first input pressure value to an input channel of the decoder and the second flow rate provides a second input pressure value to the input channel of the decoder.

2. The method of claim 1, wherein inducing the second flow rate of the fluid in the channel at the high pressure state of the gate comprises inducing a second lower flow rate than the first flow rate.

3. The method of claim 1, wherein inducing the second flow rate of the fluid in the channel at the high pressure state of the gate comprises inducing a second higher flow rate than the first flow rate.

4. The method of claim 1, wherein inducing the second flow rate of the fluid in the channel at the high pressure state of the gate comprises expanding the gate to constrict the channel.

5. The method of claim 1, wherein inducing the second flow rate of the fluid in the channel at the high pressure state of the gate comprises opening a valve with the gate.

6. The method of claim 1, wherein inducing the second flow rate of the fluid in the channel at the high pressure state of the gate comprises closing a valve with the gate.

7. The method of claim 1, wherein inducing the second flow rate of the fluid in the channel at the high pressure state of the gate comprises constricting the channel with a rigid body.

8. The method of claim 1, wherein the decoder is configured to also receive another input pressure value to a second input channel of the decoder.

9. The method of claim 1, wherein transporting the fluid through the channel from the source to the drain comprises transporting the fluid from the source, through the gate, and to the drain.

10. A method of operating a fluidic device, comprising:
    transporting fluid through a channel from a source to a drain at a first flow rate;
    transporting the fluid from the drain to an input channel of a decoder at a first input pressure value associated with the first flow rate;
    constricting the channel between the source and the drain with a gate based on fluid pressure within the gate;
    transporting the fluid through the channel from the source to the drain at a second, lower flow rate; and
    transporting the fluid from the drain to the input channel of the decoder at a second input pressure value associated with the second flow rate.

11. The method of claim 10, wherein constricting the channel with the gate comprises increasing a fluid pressure within the gate to constrict the channel.

12. The method of claim 10, wherein constricting the channel with the gate comprises decreasing a fluid pressure within the gate to constrict the channel.

13. A method of fabricating a fluidic device, comprising:
    coupling a gate to a conduit between a source and a drain of the conduit such that the gate is positioned and configured to control a rate of fluid flow between the source and the drain based on fluid pressure within the gate; and
    coupling an input channel of a decoder to the drain of the conduit, such that the rate of fluid flow between the source and the drain provides an input pressure value to the input channel of the decoder.

14. The method of claim 13, wherein coupling the input channel of the decoder to the drain of the conduit comprises coupling a first input channel of the decoder to the drain, wherein the decoder further comprises a second input channel and four output channels.

15. The method of claim 13, wherein coupling the gate to the conduit between the source and the drain of the conduit comprises positioning at least one micro arm within the conduit.

16. The method of claim 13, wherein coupling the gate to the conduit between the source and the drain of the conduit comprises coupling a fixed and inflexible gate to the conduit.

17. The method of claim 13, wherein coupling the gate to the conduit between the source and the drain of the conduit comprises coupling a flexible and deformable gate to the conduit.

18. The method of claim 13, wherein coupling the gate to the conduit between the source and the drain of the conduit comprises positioning the gate on an exterior of the conduit, wherein the gate is positioned and configured to constrict the conduit upon increasing a fluid pressure at the gate.

19. The method of claim 13, wherein coupling the gate to the conduit between the source and the drain of the conduit comprises positioning the gate on an exterior of the conduit, wherein the gate is positioned and configured to constrict the conduit upon decreasing a fluid pressure at the gate.

20. The method of claim 13, wherein coupling the gate to the conduit between the source and the drain of the conduit comprises at least partially surrounding the conduit by the gate.

* * * * *